(12) United States Patent
Lopes

(10) Patent No.: US 8,197,683 B2
(45) Date of Patent: *Jun. 12, 2012

(54) SYSTEM FOR CONDITIONING FLUIDS UTILIZING A MAGNETIC FLUID PROCESSOR

(76) Inventor: William Steven Lopes, Huntington Beach, CA (US)

(*) Notice: Subject to any disclaimer, the term of this patent is extended or adjusted under 35 U.S.C. 154(b) by 668 days.

This patent is subject to a terminal disclaimer.

(21) Appl. No.: 12/235,468

(22) Filed: Oct. 16, 2008

(65) Prior Publication Data

US 2010/0095847 A1    Apr. 22, 2010

(51) Int. Cl.
    *C02F 1/48* (2006.01)
    *B01D 35/06* (2006.01)
(52) U.S. Cl. ......... 210/222; 210/695; 204/554; 204/660
(58) Field of Classification Search .................. 210/222, 210/223, 695; 204/554, 660
    See application file for complete search history.

(56) References Cited

U.S. PATENT DOCUMENTS

| | | | | |
|---|---|---|---|---|
| 2,611,001 | A * | 9/1952 | Ridgers | 174/7 |
| 2,652,925 | A | 9/1953 | Vermeiren | |
| 3,206,657 | A * | 9/1965 | Moriya | 335/303 |
| 4,407,719 | A | 10/1983 | Van Gorp | |
| 4,414,951 | A * | 11/1983 | Saneto | 123/538 |
| 4,417,985 | A | 11/1983 | Keane | |
| 4,428,837 | A | 1/1984 | Kronenberg | |
| 4,430,785 | A | 2/1984 | Sanderson | |
| 4,552,664 | A | 11/1985 | Benner | |
| 5,024,759 | A | 6/1991 | McGrath et al. | |
| 5,074,998 | A | 12/1991 | Doelman | |
| 5,122,277 | A | 6/1992 | Jones | |
| 5,161,512 | A | 11/1992 | Adam et al. | |
| 5,178,757 | A | 1/1993 | Corney | |
| 5,198,106 | A | 3/1993 | Carpenter | |
| 5,227,683 | A | 7/1993 | Clair | |
| 5,269,915 | A | 12/1993 | Clair | |
| 5,378,362 | A * | 1/1995 | Schoepe | 210/222 |
| 5,683,579 | A | 11/1997 | Lopes | |
| 5,716,520 | A * | 2/1998 | Mason | 210/222 |
| 6,123,843 | A * | 9/2000 | Schoepe | 210/222 |
| 6,143,171 | A | 11/2000 | Van Aarsen | |
| 6,602,411 | B1 | 8/2003 | Aida et al. | |
| 6,776,905 | B2 | 8/2004 | Chang | |
| 2006/0011557 | A1 * | 1/2006 | Cho | 210/748 |

OTHER PUBLICATIONS

U.S. Appl. No. 12/235,518, Lopes.
U.S. Appl. No. 12/235,440, Lopes.

* cited by examiner

*Primary Examiner* — Tony G Soohoo
*Assistant Examiner* — David C Mellon
(74) *Attorney, Agent, or Firm* — Jafari Law Group, Inc.; David V. Jafari

(57) ABSTRACT

The invention is a system and method for conditioning fluids utilizing a magnetic fluid processor or device that includes an elongated housing comprising a core enclosed by a magnetic component in combination with an electrical return path. The process utilizes said device to affect and electron configuration within fluids by generating a magnetic field, thereby separating, for example, metals and organic or inorganic materials from fluids, in order to achieve desired fluid composition and properties.

23 Claims, 18 Drawing Sheets

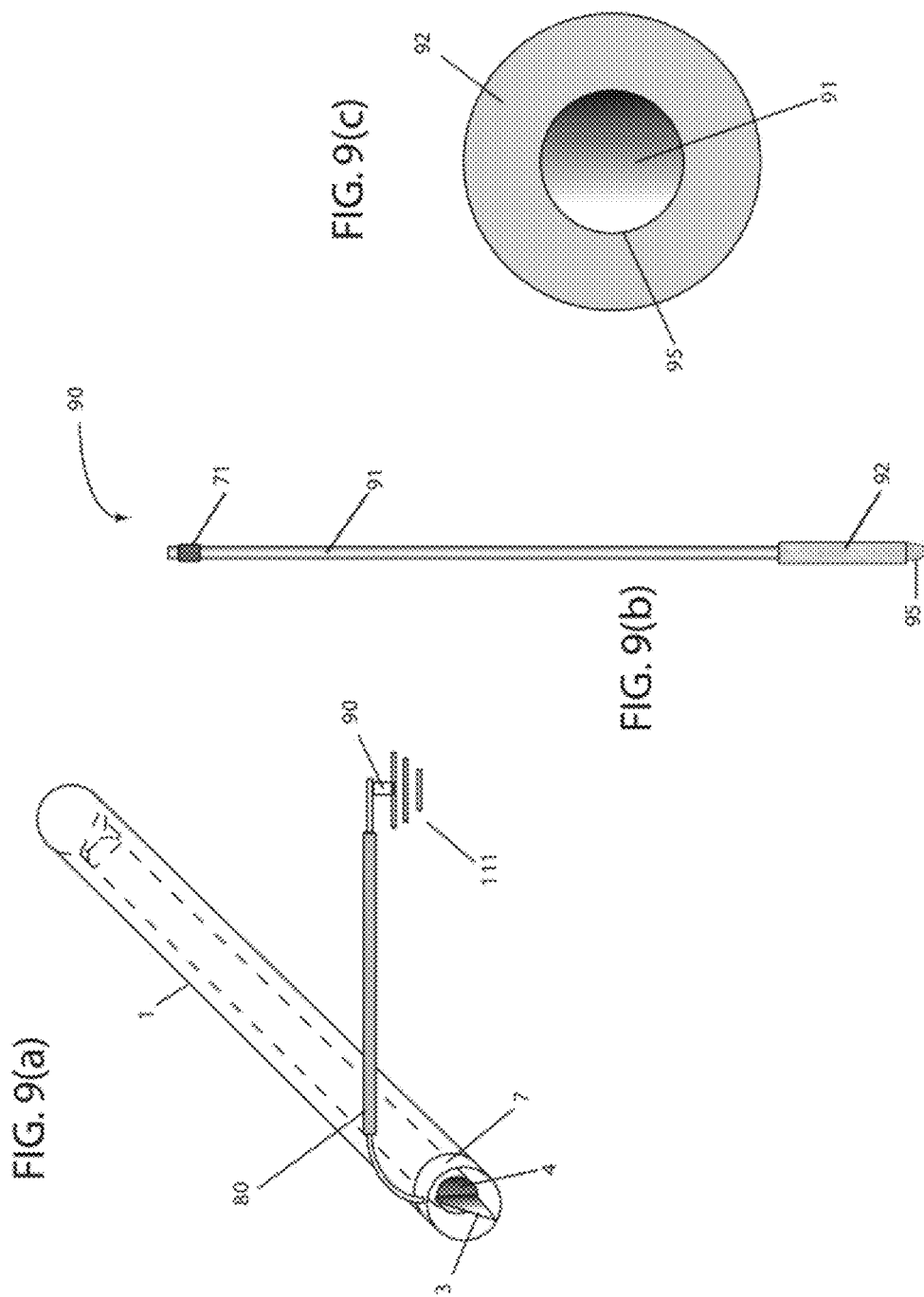

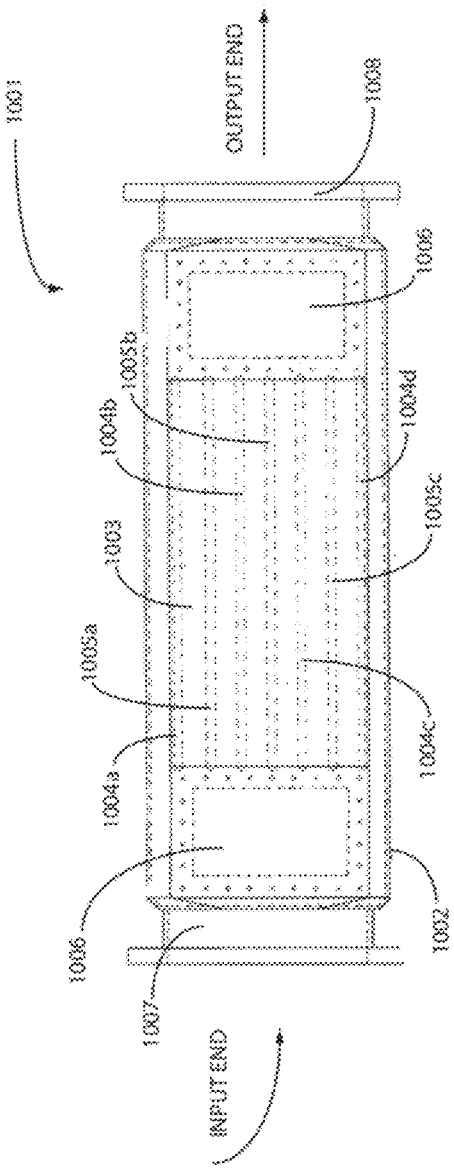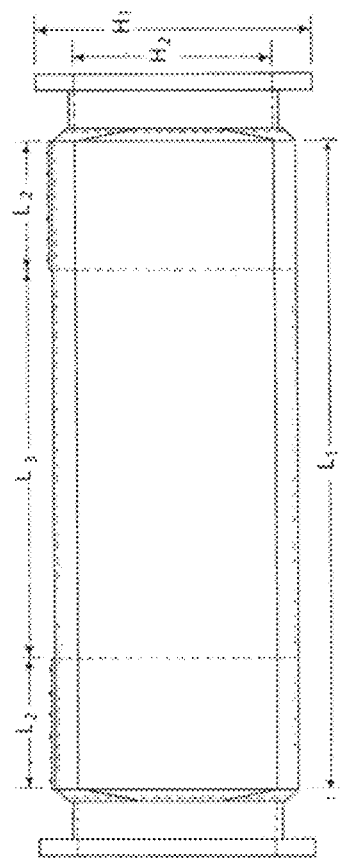
FIG. 10(a)
FIG. 10(b)

SYSTEM FOR CONDITIONING FLUIDS UTILIZING A MAGNETIC FLUID PROCESSOR

TECHNICAL FIELD OF THE INVENTION

The present invention relates in general to a system and method for conditioning fluids utilizing a magnetic fluid processor. More specifically, the present invention relates to a device that includes an elongated housing comprising a core enclosed by a magnetic component in combination with an electrical return path, which affects the electron configuration within fluids, thereby separating metals and organic or inorganic materials from fluids, in order to achieve desired fluid composition and properties.

COPYRIGHT & TRADEMARK NOTICE

A portion of the disclosure of this patent application may contain material that is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

BACKGROUND OF THE INVENTION

It is known in the art that a magnetic flux can prevent the buildup of scale and other materials in pipes which transport fluid. For example, some devices found in the prior art utilize a magnet placed outside a ferrous pipe for inducing a magnetic flux within the ferrous pipe in order to prevent calcium build-up along the wall of the ferrous pipe.

Other devices have been designed incorporating the concept of inducing a magnetic flux within a pipe or tube transporting fluid, and strengthening such flux to separate undesired materials from water.

For example, U.S. Pat. No. 5,683,579 by Lopes discloses a device comprising a plurality of magnets placed exterior to a fluid-carrying pipe; a control electrical return path ("CERP") which includes an electrically conductive member (such as copper, ferrous or steel wire), connected electronically to the core, but not in electrical contact with the pipe, and which runs to a lower electrical potential. It also discloses that the CERP enhances the separation process caused by magnets surrounding a fluid-carrying pipe.

Although other devices such as the one disclosed by Lopes, presented important breakthroughs in magnetic fluid conditioning and separation devices, further modifications are still required to increase the fluid conditioning system and separation efficiency, consistency, predictability, as well as the durability of such devices regardless of the impurity of the fluid, the volume and flow rate of the fluid entering the device, or the size of the device itself.

Prior devices, such as the one disclosed in U.S. Pat. No. 5,683,579, have a solid core made of a cylindrically-shaped conductive material (such as copper or stainless steel) located at the zero gauss region within such devices. If the size the size of the device increases in length or diameter, a longer and thicker solid core was typically required to cover the zero gauss region within the device, as well as to achieve the same fluid conditioning and separation results as its smaller counterparts. As a result, problems arose with the use of a solid core in such larger devices.

For example, larger solid cares were very heavy and therefore, made the device mechanically cumbersome to build, transport and install. This requires more materials to support the heavier, larger solid cores; thus, adding more weight to the device. Therefore, there is a need for an alternative core, which weighs less and performs the same task, yet is more efficient, cost-effective, and generates better results without the need for costly modifications.

One of the major problems prominent in the prior art is the use of a solid core as the only means or material used to collect electrons that are magnetically separated from the fluid, said core typically being the only grounded surface within the device through which the collected electrons could flow to a dedicate earth ground.

In such devices, the solid core is typically secured within a pie of the device but designed so that the core is not in electrical contact with the pipe. By limiting the electron surface collection area to the solid core, such devices required already treated fluids to undergo multiple treatments through said devices in order to properly condition said fluids.

Some devices have attempted to improve the above mentioned efficiency problem by creating devices comprising much larger cores in order to increase the electron collection surface area within the device. However, this approach creates further problems with respect to transportation, manufacturing, and ultimately installation of said devices, due to the additional materials that must be utilized in order to achieve these denser, heavier, larger devices; the costly process of producing such devices is not only an additional problem, but make the device costly and impractical for use in applications that require large amounts of fluid to be conditioned efficiently and expeditiously. Thus, there is a need to increase the electron collection surface area in order to optimize efficiency when conditioning fluids.

Lastly, as discussed in U.S. Pat. No. 5,683,579, the ability to remove electrons in volume ranges of milliamps and microamps from a magnetic fluid conditioner and separation device is directly affected by the grounding systems used. Prior devices, which incorporate CERP or any grounding system, use conventional solid copper or copper clad grounding rods. Such conventional solid copper or copper clad ground rods perform well enough for higher voltages and/or electrical volumes, and are good conductors.

However, prior devices, which use such conventional ground rods, experience an impedance of electrical flow the devices themselves. One of the reasons why this is the case is that such conventional ground rods also serve as an electron sink for triboelectric charges that move through the moisture in the air and on or below the earth's surface. These triboelectric charges seek a lower electrical potential and find it within any conventional ground rod, such as a solid copper or copper clad ground rod. Varying outside charges flowing into the conventional ground rod greatly affects the low voltage flows and volumes of electrons that a magnetic fluid conditioner and separation device utilizing a CERP or any grounding system can extract or produce.

As a result, these outside charges create and impedance of electrical flow from the device. At varying times, the impedance can become so high that the fluid within the device becomes the lower potential in the circuit. Thus, there is a need for an improved fluid conditioning device that includes a ground rod that would serve as a stable conduit for electrons to flow from the magnetic fluid conditioning and separation device into the earth, and not attract such triboelectric charges and/or stray charges from outside sources.

In light of the preceding, there exists a need to further improve the art. Specifically, there is a need for an improved magnetic fluid conditioner and separation device which has a lightweight core, an increased electron surface collection area, and a grounding system which includes an improved ground rod, which (a) serves as a stable conduit for electrons to flow from the device into the earth and, (b) is unattractive or invisible to any triboelectric charges an/or stray charges from sources other that the device.

The difficulties and limitations suggested in the preceding are not intended to be exhaustive, but rather are among many undesirable challenges unsolved or not taught by the prior. The present invention overcomes the above described disadvantages of fluid conditioning devices, and it is to these ends that the present invention has been developed.

SUMMARY OF THE INVENTION

To minimize the limitations in the prior art, and to minimize other limitations that will be apparent upon reading and understanding the present specification, the present invention describes a system and method for conditioning fluids utilizing a magnetic fluid processor, which incorporates a device that includes an elongated housing comprising a core enclosed by a magnetic component in combination with an electrical return path. The process utilizes said device to remove or add electrons within fluids, thereby separating metals and organic or inorganic materials from fluids, in order to achieve a desired fluid composition.

A fluid conditioning system, in accordance with one exemplary embodiment of the present invention, comprises: a source for providing a first fluid; and a sink for emitting said first fluid, wherein said first fluid is emitted into said sink in a conditioned state after being processed by a fluid processor.

The fluid processor further comprises of a first elongated housing coupled to said source and said sink, said first elongated housing adapted to guide said first fluid from an input end in and through an output end of said first elongated housing, a second elongated housing adapted to store a second fluid, wherein said second elongated housing is situated within said first elongated housing, and a third elongated housing including a plurality of magnets staggered in a longitudinal direction in relation to said first and second elongated housings, wherein said plurality of magnets are configured to generate a magnetic field in a manner so as to affect an electron configuration of said first fluid.

A fluid conditioning system, in accordance with another exemplary embodiment of the present invention, comprises: a first source for providing a first fluid; a second source for providing a second fluid; and a sink for emitting said first and second fluids, wherein said first and second fluids are mixed and emitted into said sink in a conditioned state after being processed by a fluid processor.

Said fluid processor includes a first elongated housing coupled to said source and said sink, said first elongated housing adapted to guide said first and second fluids from an input end in and through an output end of said first elongated housing, a second elongated housing adapted to store a third fluid, wherein said second elongated housing is situated within said first elongated housing, and a third elongated housing including a plurality of magnets staggered in a longitudinal direction in relation to said first and second elongated housings, wherein said plurality of magnets are configured to generate a magnetic field in a manner so as to affect an electron configuration of said first and second fluids.

A fluid conditioning system, in accordance with yet another exemplary embodiment of the present invention, comprises: a source for providing a first fluid; and a sink for emitting said first fluid, wherein said first fluid is emitted into said sink in a conditioned state after being processed by a fluid processor.

Said fluid processor further comprises a first elongated housing coupled to said source and said sink, said first elongated housing adapted to guide said first fluid from an input end in and through an output end of said first elongated housing; a second elongated housing adapted to store an inert gas; wherein said second elongated housing is situated within said first elongated housing; a third elongated housing including a plurality of magnets staggered in a longitudinal direction in relation to said first and second elongated housings, wherein said plurality of magnets are configured to generate a magnetic field in a manner so as to affect an electron configuration of said first fluid.

Furthermore, an electrical conductive member is placed in electrical contact with said second elongated housing and to an electrical potential less than the potential of said second elongated housing so that electrical charges are removed from said second elongated housing, wherein said electrical potential is ground.

It is an objective of the present invention to provide a novel device for magnetically conditioning and separating fluids, which will obviate or minimize difficulties and limitations previously described.

It is another objective of the present invention to provide a more efficient, cost-effective device for magnetically conditioning and separating fluids, which utilizes a lightweight core.

It is yet another objective of the present invention to provide a device, which utilizes a lightweight core comprising a hollow enclosure for housing an inert gas that makes removing or adding electrons more efficient and cost-effective.

It is yet another objective of the present invention to provide a device that is capable of being readily reconfigured for processing fluids for a variety of applications by inter-exchanging or re-arranging a magnetic field throughout said device.

Finally, it is another objective of the present invention to provide a novel process and system for fluid treatment which has direct commercial application as an initial or final processing stage in stream line processing facilities including food processing plants (e.g., dairy processing plants), pharmaceutical plants, breweries, water treatment plants, and the like.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 9(a) illustrates a perspective view of a flow tube assembly including an electrical return path electronically connected to the flow tube, wherein said electrical return path is in electrical contact with the core.

FIG. 9(b) illustrates an exemplary embodiment of a ground rod.

FIG. 9(c) illustrates a cross-sectional view of a conical end of a ground rod comprising an outer surface cast, in accordance with an exemplary embodiment of the present invention.

FIG. 10(a) illustrates a top phantom view of another exemplary embodiment of the present invention, wherein a processor comprises of a plurality of elongated enclosures for guiding a first fluid from a plurality of input ends in and through a plurality of output ends. In such embodiment, one or more enclosures include hollow cores configured to store a second fluid, and alternating enclosures are configured to generate a magnetic field so as to affect the electron configuration of the first fluid passing through the plurality of input ends and output ends.

FIG. 10(b) illustrates a side view, particularly depicting some possible dimensions of the exemplary embodiment described with reference to FIG. 10(a).

DETAILED DESCRIPTION OF THE DRAWINGS

In the following discussion that addresses a number of embodiments and applications of the present invention, reference is made to the accompanying drawings that form a part hereof, where depictions are made, by way of illustration, of specific embodiments in which the invention may be practiced. It is to be understood that other embodiments may be utilized and changes may be made without departing from the scope of the present invention.

In the present disclosure the term fluid means any substance that continually deforms (i.e. flows) under an applied shear stress regardless of how minimal the applied stress may be. The term fluid includes any subset of the phases of matter and include liquids, gases, plasmas and, to some extent, plastic solids. For example, a fluid in accordance with the present disclosure may be any substance that displays such properties as: not resisting deformation, or resisting it only lightly (i.e. having viscosity), and/or the ability to flow. The term flow, for example, may refer to or be described as the ability to take on the shape of a container, vessel, pathway, pipeline, cavity, or tube.

The term housing may be defined to include a container, a vessel, a pathway, a pipeline, a tube, or an enclosure. Furthermore, a housing and/or enclosure in accordance with the present invention may comprise a variety of characteristics without deviating from the scope of the present invention. For example, a housing and/or enclosure may comprise a substantially tubular shape, a substantially cubical shape, a substantially polygonal shape, and may be of a wide variety of shapes, sizes, widths, lengths and configurations without deviating from the scope of the present invention. Naturally, several examples of different housing and enclosure configurations will be provided by way of embodiments of the present invention. Again, it is understood that the embodiments described herein are not to limit the scope of the present invention.

Figure 1:
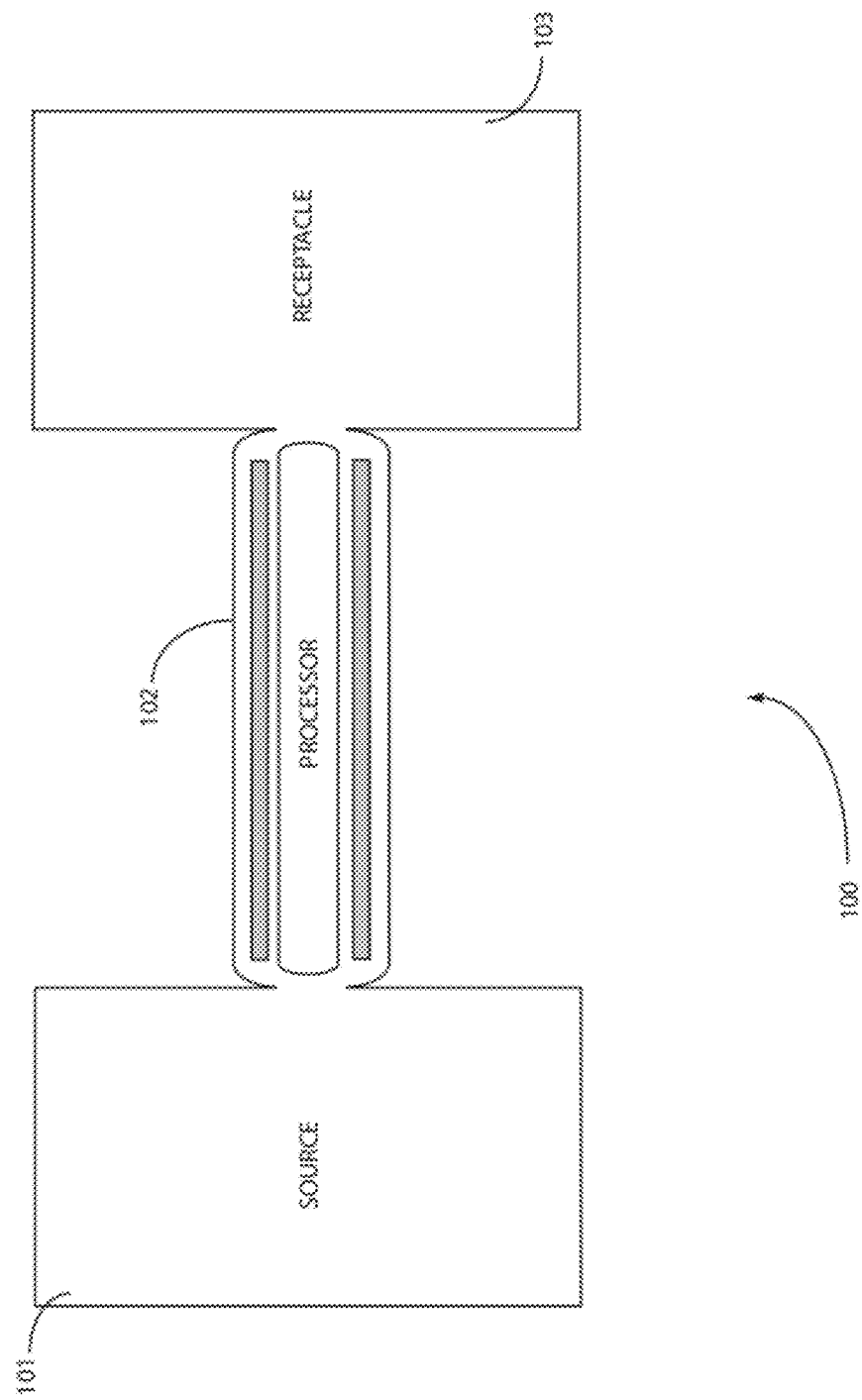
FIG. 1 illustrates a block diagram of one embodiment comprising a single source for supplying a fluid to be processed or conditioned through a magnetic fluid processor in accordance with the present invention.

Turning to the first figure, FIG. 1 illustrates a block diagram of one embodiment of the present invention, with one source that is filtered. More specifically, FIG. 1 shows fluid conditioning system 100 (system 100), which comprises of source 101, receptacle 102, and fluid conditioning processor 103 (processor 103).

Typically, system 100 is one in which unconditioned fluid contained in source 101 flows through processor 103 where it is conditioned. The resulting fluid flows to sink 102, wherein said fluid has been conditioned. Said conditioning may be for a variety of applications.

For example and without limiting the scope of the present invention, system 100 may be utilized to purify water, condition food products to meet desired quality standards, or be utilized for any initial or final processing stage in stream line processing facilities including food processing plants (e.g. dairy processing plants), pharmaceutical plants, breweries, water treatment plants, and the like.

In one embodiment, system 100 comprises a water filtration unit in an agricultural irrigation system. In said embodiment, source 101 may be contaminated water collected from wells, springs, ponds or city water lines. Said contaminants may include calcium carbonate, magnesium carbonate and salt, which may be harmful to the targeted vegetation.

In processor 103, this impure water flows through a magnetic field, which removes any unwanted minerals from the water. The resulting water may then flow to sink 103, for example a sprinkler or water emitting processor in said irrigation system.

Many other uses and applications are possible with system 100 and several examples will be identified, without limiting the scope of the present invention, in greater detail below.

Figure 2:
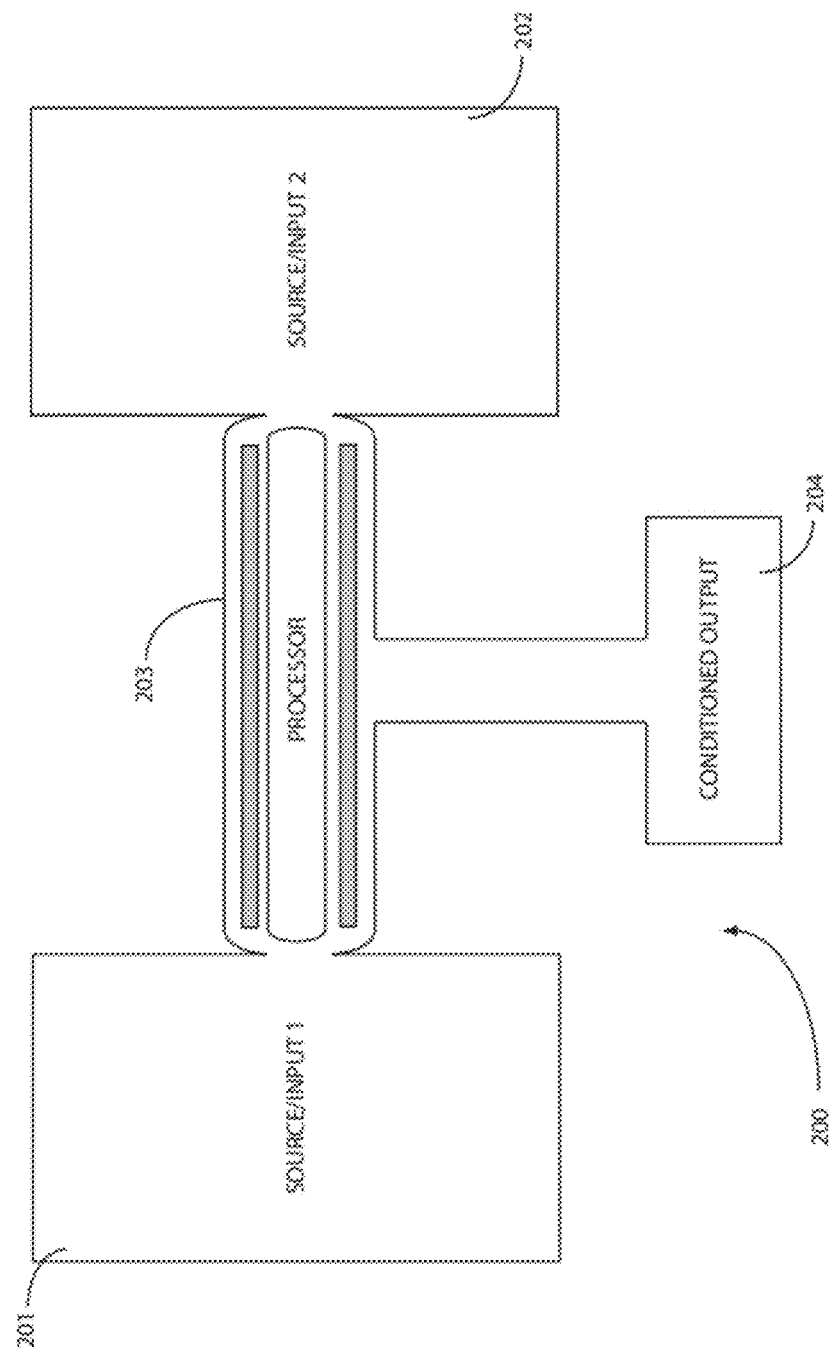
FIG. 2 illustrates a block diagram of another embodiment of the present invention, comprising multiple sources for supplying one or more fluids to be processed or conditioned through a magnetic fluid processor.

FIG. 2 illustrates another embodiment of the present invention. System 200 comprises a first source or input 201 (source 201), a second source or input 202 (source 202), a processor 203 and a conditioned fluid output 204 (output 204).

While the block diagram representing system 200 is shown with processor 203 comprising two inputs and a single output, it is understood that various configurations for system 200 may be achieved without deviating from the scope of the present invention. For example, source 201 and source 202 may be mixed into an additional container, and then introduced into a single input end of processor 203 for conditioning and exiting via a single output end. Thus, FIG. 2 is not to be limiting the scope of the present invention in any way, but rather a representation of the various configurations in accordance with the present invention.

Processor 203 intakes fluid contained in source 201 and source 202 where they are conditioned as described above with reference to FIG. 1. The resulting fluid flows into output 204 in the desired conditioned state.

Again, any uses and applications are possible with system 200 and several examples will be identified, without limiting the scope of the present invention, in greater detail below.

Figure 3:
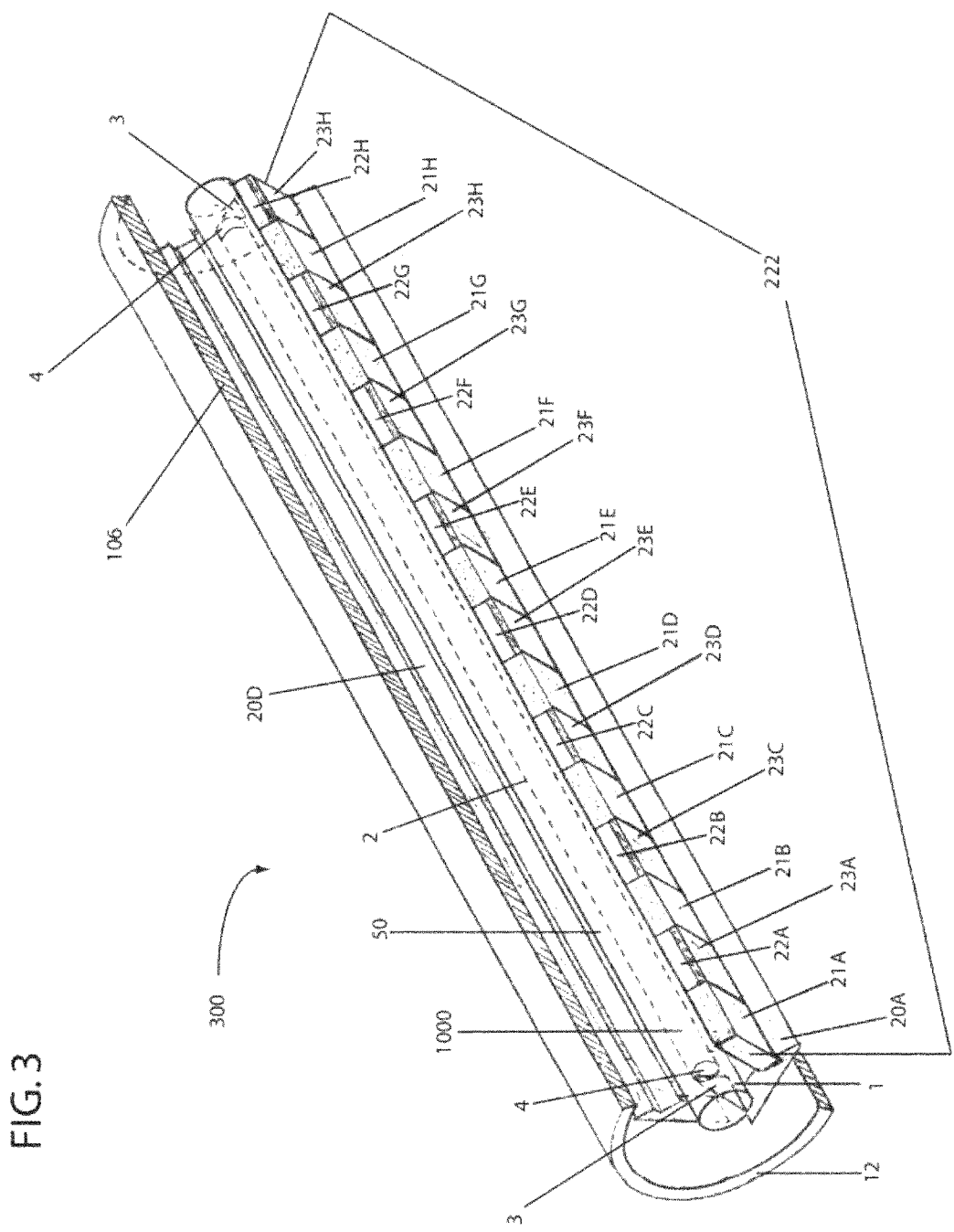
FIG. 3 illustrates a cut-away and perspective view of a fluid processing unit, in accordance with an exemplary embodiment of the present invention.

Turning to the next figure, FIG. 3 illustrates a cut-away and perspective view of a fluid processing unit, in accordance with an exemplary embodiment of the present invention.

Specifically, FIG. 3 shows processor 300 is shown comprising of a plurality of magnets housed within an elongated housing (i.e. in the shown embodiment said housing comprising a pipe or flow tube), an inner housing or tube, and a core created within said inner housing surrounded by said plurality of magnets.

Figure 8A:
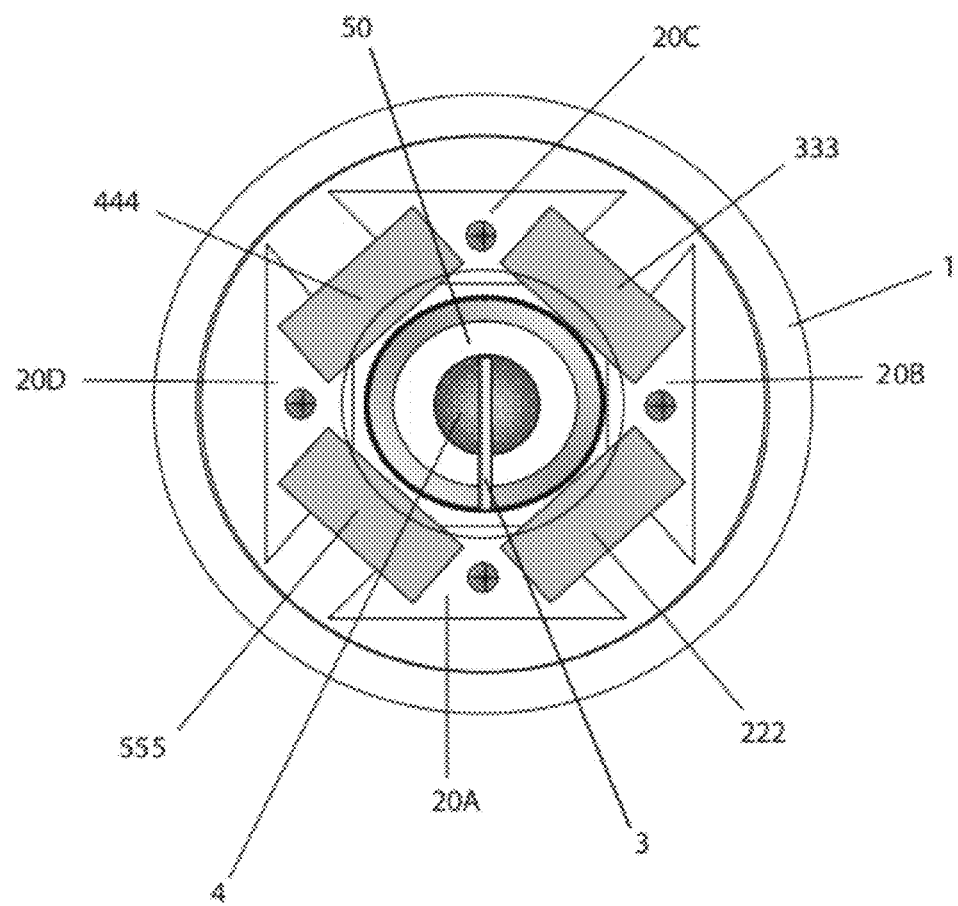
FIG. 8(a) illustrates a cross-sectional end view of one embodiment of the present invention, wherein a flow tube assembly comprising a plurality of magnets, a plurality of magnetic arrays to hold said magnets, a concentrically situated flow tube, and a hollow core enclosed by said magnetic arrays, are shown.

In an exemplary embodiment, as shown in FIG. 3 and FIG. 8(a), processor 300 includes a flow tube assembly of a pipe or flow tube 1, which carries the fluid to be treated. Flow tube 1 may be made of any non-magnetic, conductive material, such as ferrous material, copper, stainless steel, aluminum, a conductive polymer or any other non-magnetic, conductive material.

Processor 300 may be connected to fluid flow lines by generally recognize plumbing materials. Fluid flows in one end of flow tube 1 (i.e. fluid input end) from a fluid flow line connected thereto to the opposite end (i.e. fluid output end) of the flow tube 1. The fluid is treated within flow tube 1, and flows within a fluid flowing cavity 50 of the flow tube assembly.

The flow tube assembly also includes a core 2, which runs concentrically within flow tube 1, and resides within the zero gauss region of the flow tube 1. Core 2 may be solid and made of any non-magnetic, conductive material, such as ferrous material, copper, stainless steel, aluminum, a conductive polymer or any other non-magnetic, conductive material.

In an exemplary embodiment, as shown, core 2 may be a hollow core tube with end caps 4 attached and sealed at each end of core 2; thereby creating a sealed hollow chamber 1000 within core 2. Such core tube 2 and end caps 4 may be made of non-magnetic, conductive material, such as ferrous material, copper stainless steel, aluminum, a conductive polymer or any other non-magnetic, conductive material.

Sealed hollow chamber 1000 may be filled with a noble gas, such as argon, or any gas that is inert or a non-electrically conductive fluid, such as pure mineral oil or distilled water. By doing so, such non-electrically conductive fluid or inert noble gas will replace the air in sealed hollow chamber 1000. Air contains a mixture of gases that acts in an electronegative manner, i.e., acquires and releases electrons. As fluid flows through flow tube 1, the air within sealed hollow chamber 1000 repeatedly charges and discharges with measurable frequency.

This fluctuating charge/discharge effect caused by the air within sealed hollow chamber 1000 negatively impacts the efficiency of processor 300, which may be undesirable. Filling sealed hollow chamber 1000 with a noble gas or any gas that is inert or that is a non-electrically conductive fluid eliminates the above-mentioned fluctuating charge/discharge effect. In such embodiment, core tube 2 is relatively much lighter than a solid core 2; thereby, creating a novel core alternative for building devices that require a core of larger diameters and/or lengths. This is desirable to minimize costs related to the use, manufacture, or transportation of alternative heavier materials.

Core 2 may also include an outer shell made of non-corrosive material such as copper or stainless steel so that it is protected from corrosion by a fluid passing through flow tube 1. The diameter of core 2 is generally substantially less than the diameter of flow tube 1 however, other configurations may be utilized without deviating from the scope of the present invention.

The flow tube assembly of processor 300 may also include at least one core support 3, which is attached to an end of core 2 and to the interior wall of flow tube 1. Core support 3 may be in any shape which minimally disturbs or blocks fluid flowing in or out of fluid flowing cavity 50, and provides support to core 2 with the assistance of flow tube 1. Core support 3 may be in any polygonal shape (such as the trapezoid shape shown in FIG. 4(*a*)) or in a bar, pin or peg shape (as shown in FIG. 5(*a*)-(*c*)), and may be made of a non-magnetic, conductive material such as ferrous material, copper, stainless steel, aluminum, a conductive polymer or any other non-magnetic, conductive material.

Unlike prior devices, core support 3 electrically connects core 2 to flow tube 1. This may be done, for example, by welding or soldering core support 3 to core 2 and flow tube 1 via end cap 4, or, in an alternative embodiment of the present invention, via end cap 116 or reducer 115 set as shown in FIG. 5(*a*) through FIG. 5(*c*).

By electrically connecting core 2 with flow tube 1, the flow tube 1 becomes grounded (discussed later) and the interior wall of flow tube 1 is now included in collecting free electrons in fluid passing through the present invention. As a result, this novel characteristic increases the electron collection surface area of the flow tube assembly. The cross-section shape of flow tube 1 and core 2 may be circular, oval, square, rectangular, or triangular. An exemplary embodiment of a circularly shaped configuration of flow tube 1 and core 2 are shown in FIG. 8(*a*) through FIG. 8(*e*).

Figure 6A:
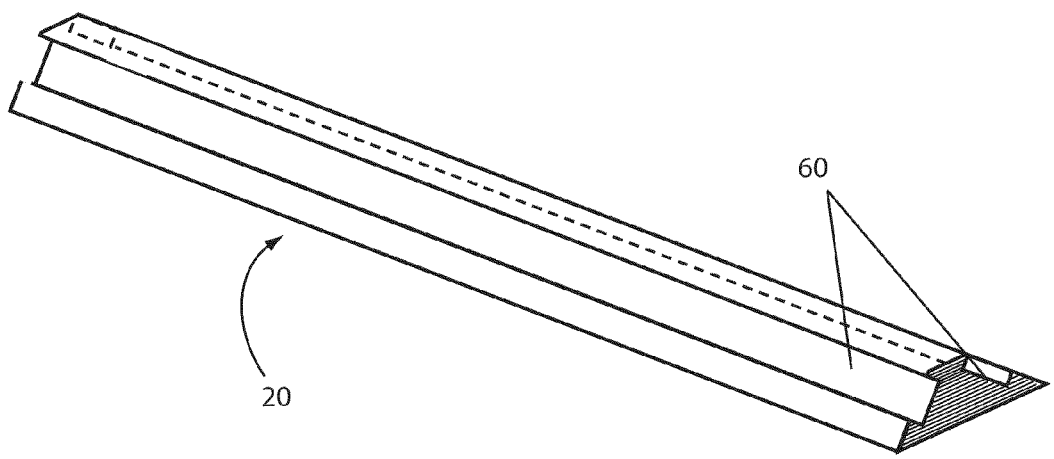
FIG. 6(a) illustrates a perspective view of a magnetic rail used in an exemplary embodiment of the present invention, utilized for staggering one or more magnets to create a magnetic field.
Figure 6B:
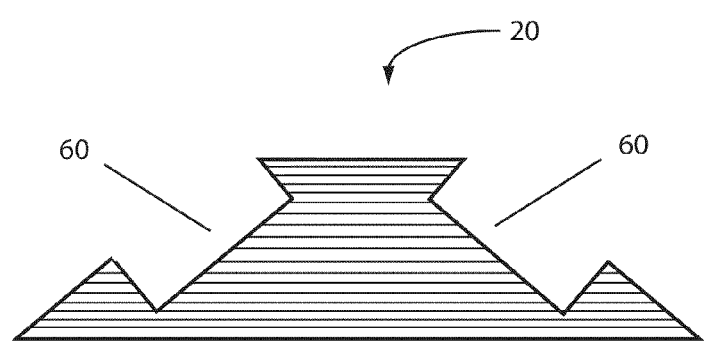
FIG. 6(b) illustrates an end view of the magnet rail shown in FIG. 6(a).

As shown in FIG. 3 and FIG. 8(*a*) through FIG. 8(*e*), processor 300 includes a magnetic array or component that comprises at least an even number of magnet rows, e.g., magnet rows 222, 333, 444, and 555, arranged equidistant from flow tube 1. Each magnet row is supported by slot 60 of a magnet rail, e.g., magnet rail 20A-20D, and covers the length of the flow tube assembly. An example of a magnet rail is shown in FIG. 6(*a*) and FIG. 6(*b*), and may be made of a non-conductive, non-magnetic material.

Each magnet row 222, 333, 444 and 555 contains a mixture of spacers, backing plates and magnets (see FIG. 7(*a*), FIG. 7(*b*) and FIG. 7(*c*), respectively). For example, as shown in FIG. 3, one end of magnet row 222 begins with a spacer 21A and then is followed by a magnet 22A with a backing plate 23A.

This alternative order of spacer/magnet with backing plate/spacer continues until the magnet row reaches the opposite end of the flow tube assembly, ending with magnet 22H with a backing plate 23H. Each magnet 22A-22H placed at each magnet's non-active face. The backing plate may be of ferrous material such as mild steel. The use of backing plates helps minimize magnetic flux fields escaping to the exterior of the device, as well as increase the penetration depth of the magnetic field facing the fluid inside fluid flowing cavity 50.

Each magnet row 222, 333, 444 and 555 includes an even number of magnets (in an exemplary magnet row, eight magnets are used). Such magnets may be equidistantly spaced by spacers along a magnet row. Types of magnets which may be used are ceramic, alnico, rare earth (preferably, neodymium iron boron) or any magnets that produce a magnetic flux density of 22,000 gauss or higher. Each magnet in magnet row 222, 333, 444 and 555 is positioned in such a manner to cause its field lines to penetrate through the fluid flowing cavity 50 and make contact with the like field of an apposing magnetic source.

Each magnet in a magnet row are placed with like poles with each of the corresponding magnets in the opposite facing magnet row (for example, the magnets in magnet row 222 are placed with like poles with each of the corresponding magnets in magnet row 444). Each magnet row 222, 333, 444 and 555 has magnet sections A, B, C, D, E, F, G, and H (e.g. magnets 22A-22H as shown in FIG. 3).

In one embodiment, magnet sections A, C, E and G are north and magnet sections B, D, F and H are south. In another embodiment (such as to kill microorganisms in a fluid), magnet sections A-H are all north. In another embodiment (such as to increase growth of microorganisms in a fluid), magnet sections A-H are all south.

Figure 4A:
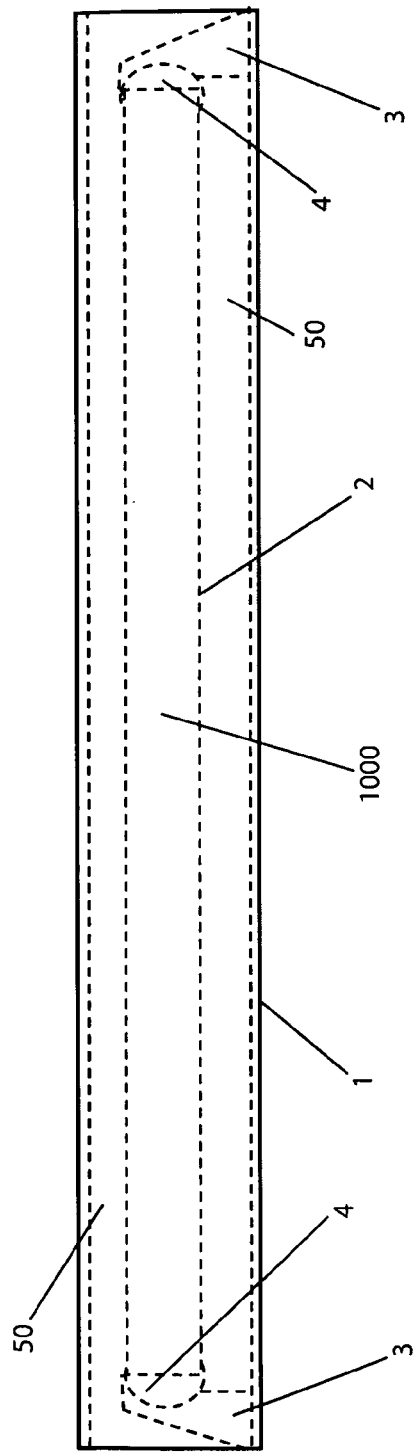
FIG. 4(a) illustrates a schematic side view of an elongated housing, in this case a flow tube assembly, in accordance with the embodiment shown in FIG. 3.
Figure 4B:
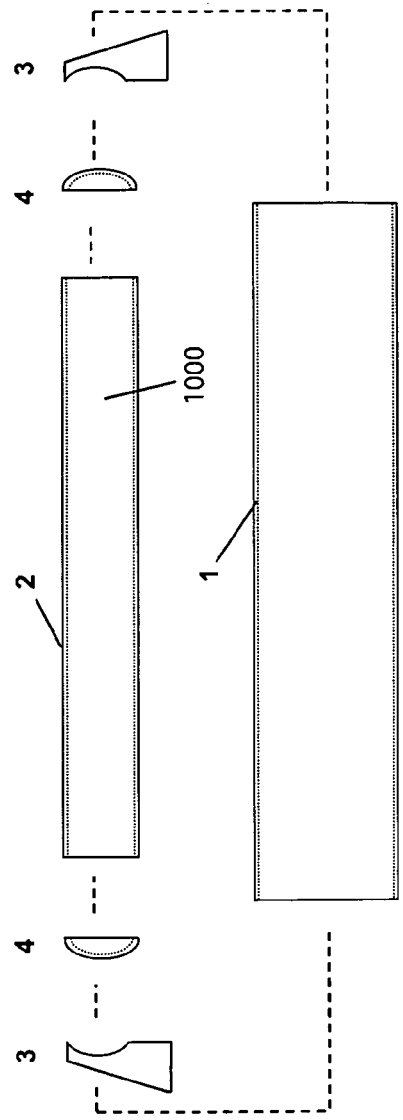
FIG. 4(b) illustrates an exploded view of the flow tube assembly shown in FIG. 4(a).
Figure 4C:
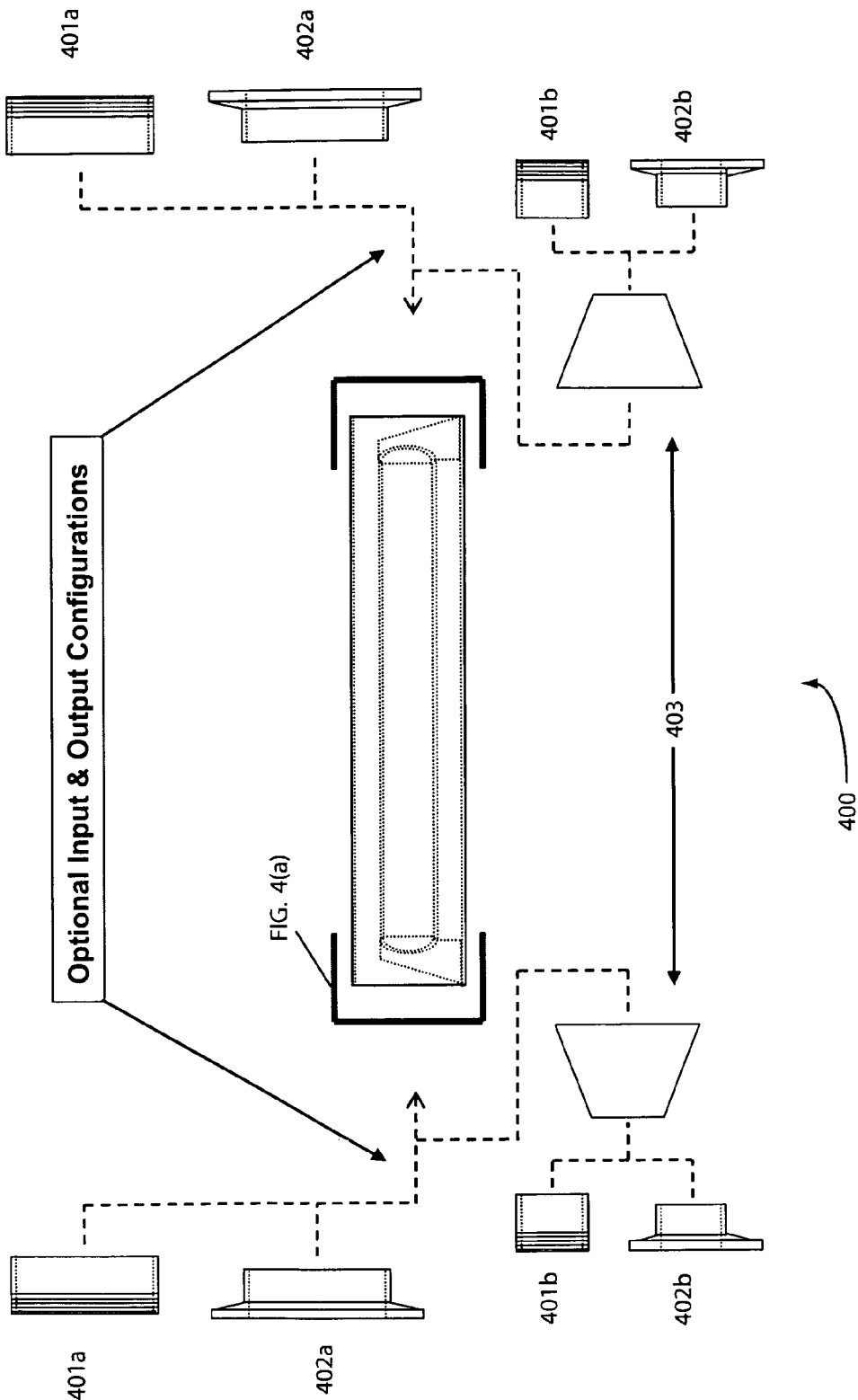
FIG. 4(c) illustrates an exploded view of the flow tube assembly shown in FIG. 4(a), further comprising alternative or optional input/output configurations of said flow tube assembly 400.
Figure 4:
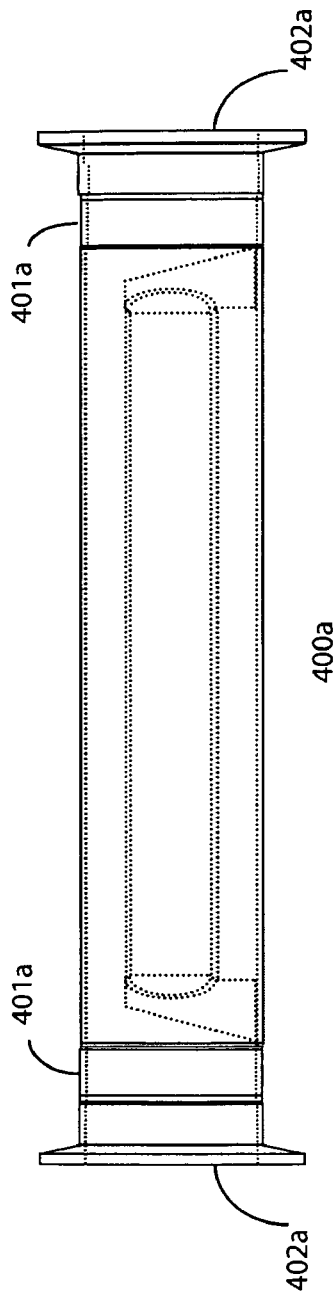
FIG. 4(d) illustrates one embodiment of flow tube assembly 400 (i.e. flow tube assembly 400a) in accordance with the present invention, wherein said view includes a phantom view of the internal assembly of said embodiment.
FIG. 4(e) illustrates another embodiment of flow tube assembly 400 (i.e. flow tube assembly 400b) in accordance with the present invention, wherein said view includes a phantom view of the internal assembly of said embodiment, which further includes reducers 403.
FIG. 4(f) illustrates an end view of the flow tube assembly depicted in FIG. 4(a).
Figure 4E:
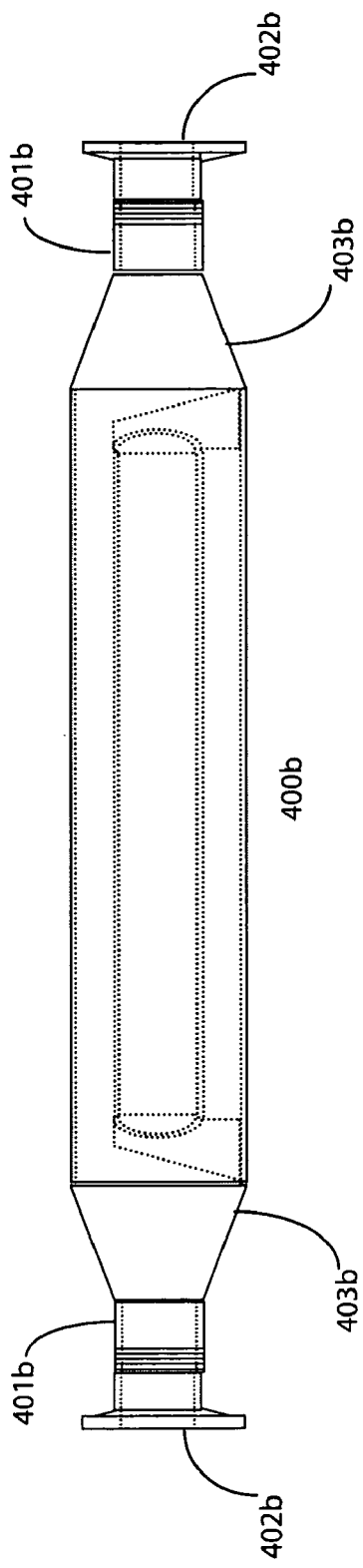
Figure 4F:
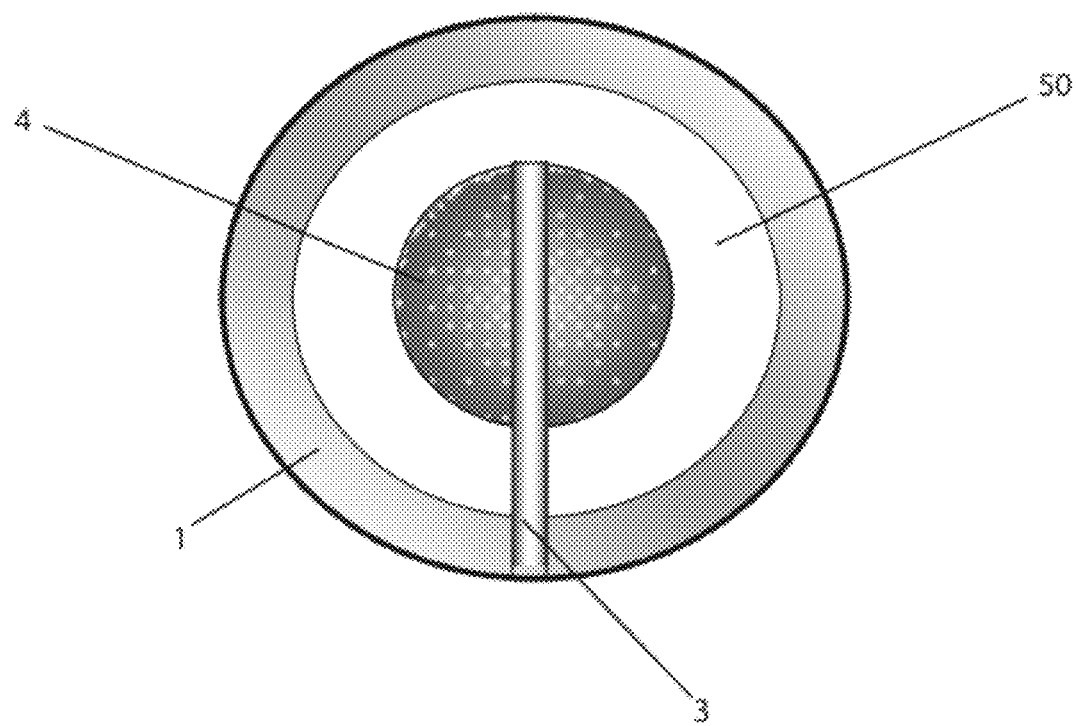
Figure 5A:
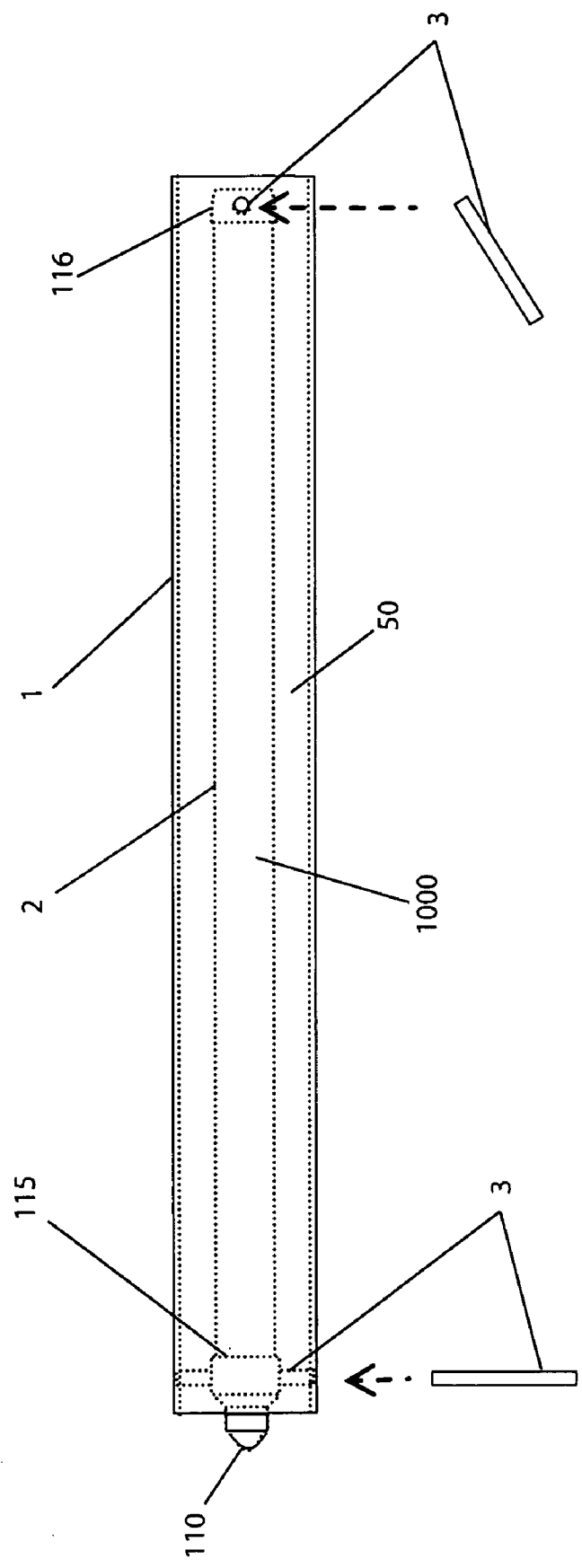
FIG. 5(a) illustrates a schematic view of a flow tube assembly used in accordance with an exemplary embodiment of the present invention.
Figure 5B:
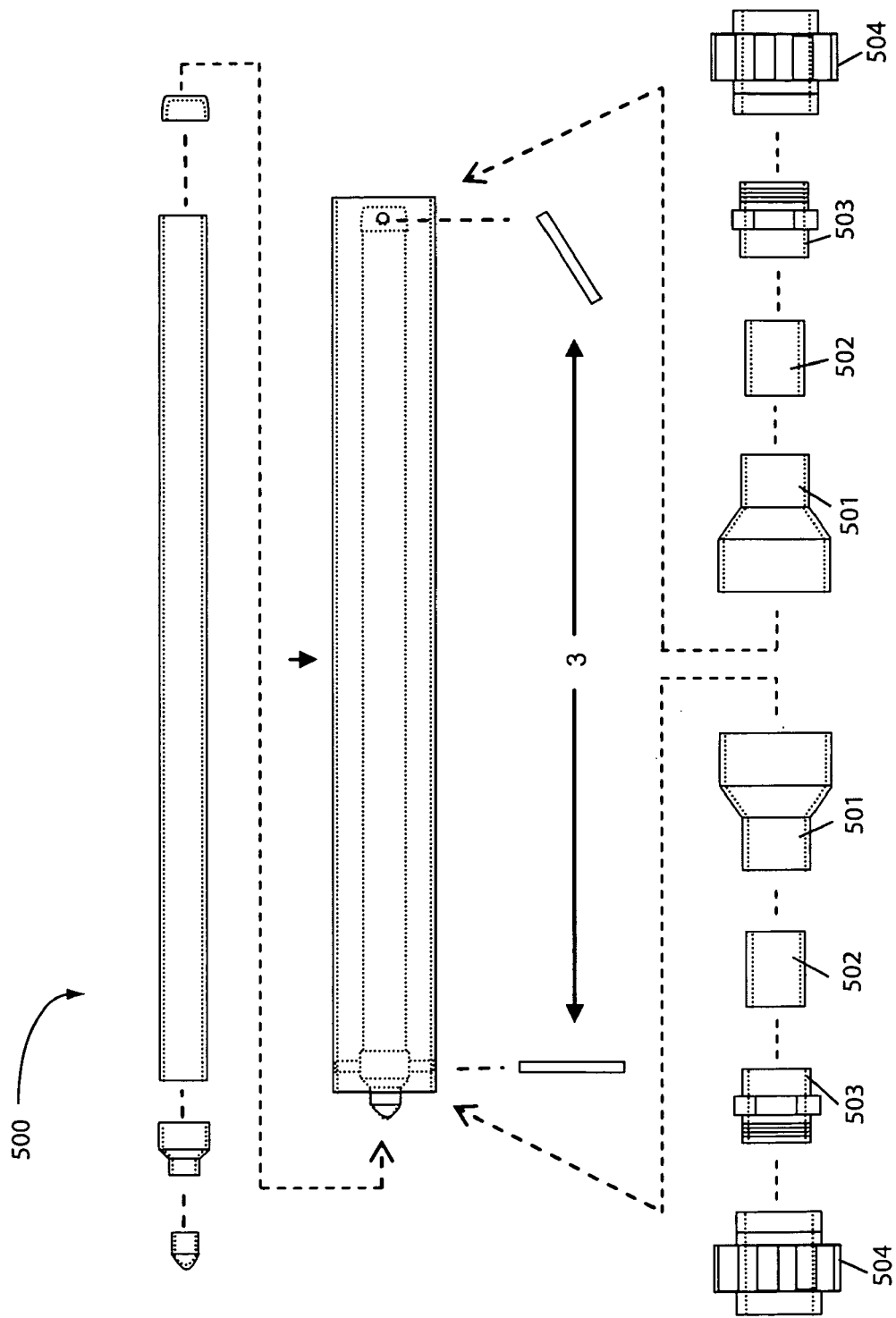
FIG. 5(b) illustrates an exploded view of another exemplary embodiment of the present invention, which includes a flow tube assembly in accordance with the embodiment disclosed and discussed in reference to FIG. 5(a).
Figure 5C:
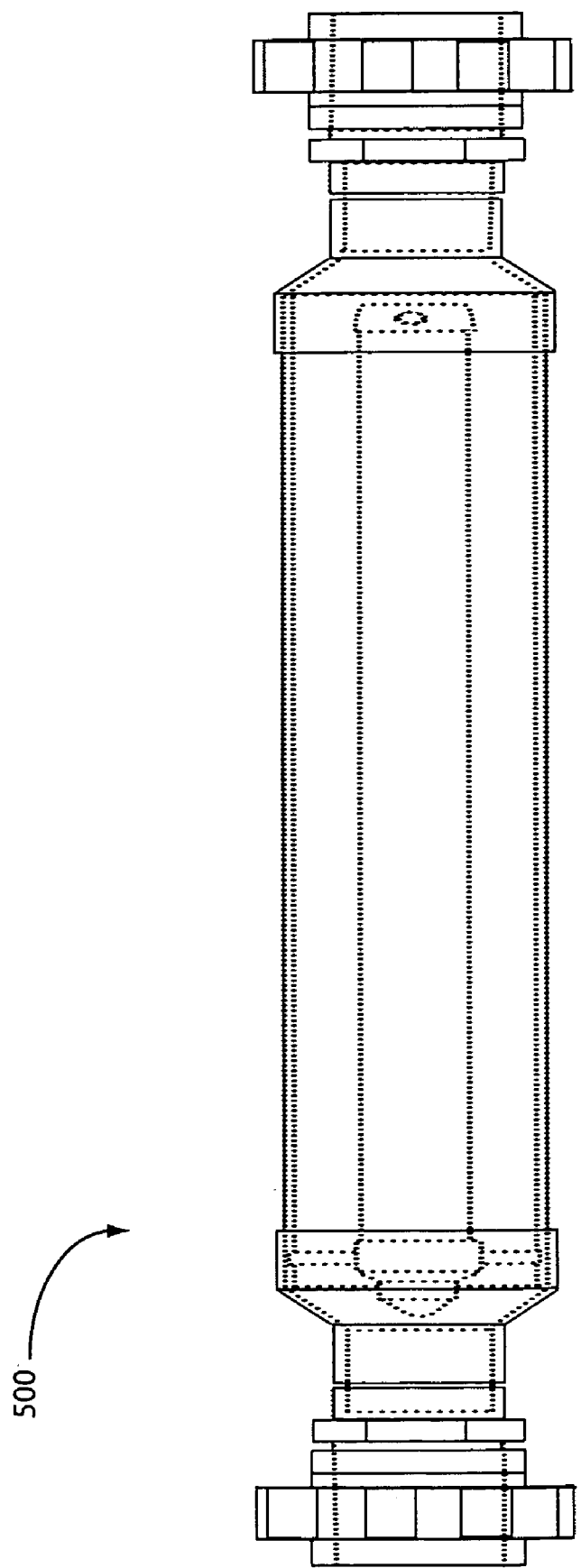
FIG. 5(c) illustrates a fully assembled view of the embodiment disclosed and discussed in reference to FIG. 5(b).

FIGS. 4(*a*) through 4(*e*) depict an embodiment of the present invention wherein the flow tube assembly is made with a stainless steel flow tube 1 and core 2 (such as 304L or 316L). More specifically, FIG. 4(*a*) illustrates a schematic side view of an elongated housing, in this case a flow tube assembly, in accordance with the embodiment shown in FIG. 3; FIG. 4(*b*) illustrates an exploded view of the flow tube assembly shown in FIG. 4(*a*) showing the already disclosed components, wherein flow tube 1, core 2, core supports 3 and end caps 4 are shown separately in an unassembled state; FIG. 4(*c*) illustrates an exploded view of the flow tube assembly shown in FIG. 4(*a*), further comprising alternative or optional input/output configurations including input/output configurations 401*a*, and 402*b*, and alternative flow reduction caps or reducers 403 for the flow tube assembly; FIG. 4(*d*) illustrates one embodiment of flow tube assembly 400 (i.e. flow tube assembly 400*a*) in accordance with the present invention, wherein said view includes a phantom view of the internal assembly of said embodiment; FIG. 4(*e*) illustrates another embodiment of flow tube assembly 400 (i.e. flow tube assembly 400*b*) in accordance with the present invention, wherein said view includes a phantom view of the internal assembly of said embodiment, which further includes reducers 403; and finally, FIG. 4(*f*) illustrates an end view of the flow tube assembly depicted in FIG. 4(*a*) specifically illustrating tube 1, which houses core 2 (not shown in this view) end cap 4, which encloses or enables core 2 to store a fluid such as an inert gas or an electrically non-conductive fluid (as described above), additionally core support 3 can also be seen from this view coupled to end cap 4 of core 2.

FIGS. 5(*a*) through 5(*c*) depict another embodiment of the present invention wherein the flow tube assembly is made with a copper flow tube 1 or core 2 (for example, such as Type L copper).

More specifically, FIG. 5(*a*) illustrates a schematic view of a flow tube assembly used in accordance with an exemplary embodiment of the present invention showing flow tube 1 and a phantom view of its internal components discussed above, primarily end cap 116 core tube reducer 115, and stub out 110; said end cap 116 and core tube reducer 115 coupled to an alternative embodiment of core support 3.

FIG. 5(*b*) illustrates an exploded view of another exemplary embodiment of the present invention, which includes a flow tube assembly in accordance with the embodiment disclosed and discussed in reference to FIG. 5(*a*), this illustration further showing flow tube reducers 501, adapter inserts 502, male adapters 503, and threaded stainless steel reinforced unions 504.

FIG. 5(*c*) illustrates a fully assembled view of the embodiment disclosed and discussed in reference to FIG. 5(*b*).

Turning to the next two figures, FIG. 6(*a*) illustrates a perspective view of a magnetic rail used in an exemplary embodiment of the present invention, utilized for staggering one or more magnets to create a magnetic field and FIG. 6(*b*) illustrates an end view of the magnet rail shown in FIG. 6(*a*).

More specifically, FIGS. 6(*a*) and (*b*) show how in one embodiment of the present invention, a component for magnetizing a housing such as a flow tube can be configured by utilizing magnetic rail 20. As explained above, magnetic rail 20 includes grooves or slots 60 for staggering or arranging a set of magnets or large single magnets in several ways depending on the desired magnetic field and desired affect on electrons of a fluid being processed by a processor in accordance with the present invention.

Figure 7A:
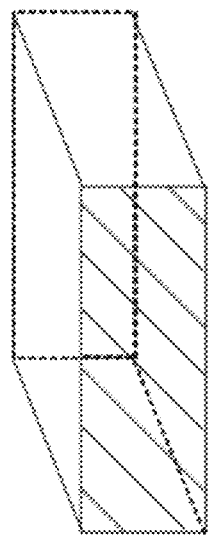
FIG. 7(a) illustrates a perspective view of a non-conductive spacer used in accordance with an exemplary embodiment of the present invention.
Figure 7B:
FIG. 7(b) illustrates a perspective view of a backing plate used in accordance with an exemplary embodiment of the present invention.
Figure 7C:
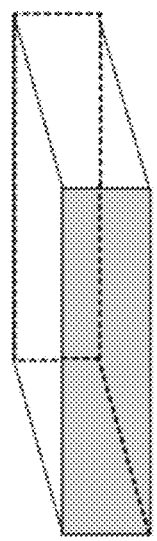
FIG. 7(c) illustrates a perspective view of a magnet used in accordance with an exemplary embodiment of the present invention.

Although it is known in the art that a magnetic field may be generated in a variety of ways, using known materials, the following figures FIG. 7(a) through FIG. 7(c) show an example, and in no way limiting the scope of the present invention, of one method of staggering magnets and other components on magnetic rail 20 to generate said magnetic field.

Simply, FIG. 7(a) illustrates a perspective view of a non-conductive spacer used in accordance with an exemplary embodiment of the present invention; FIG. 7(b) illustrates a perspective view of a backing plate used in accordance with an exemplary embodiment of the present invention; and FIG. 7(c) illustrates a perspective view of a magnet used in accordance with an exemplary embodiment of the present invention.

Figure 8B:
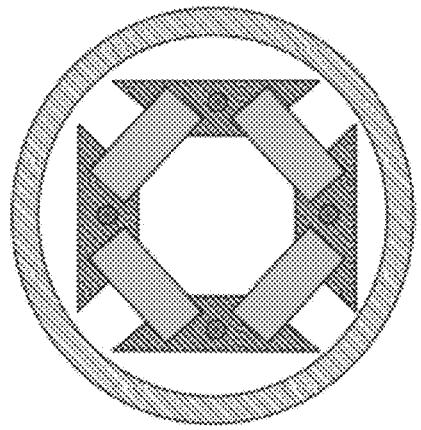
FIG. 8(b) illustrates a cross-sectional view of the flow tube assembly's magnetic rails including staggered magnets, which carry the staggered magnets along the elongated housings that in one embodiment, enclose the flow tube's core.
Figure 8C:
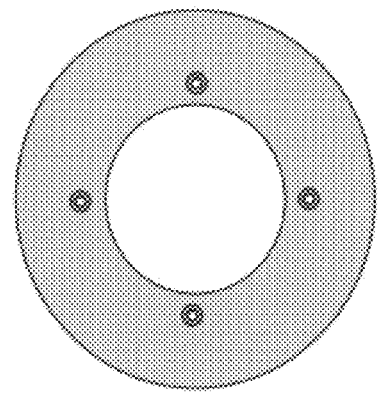
FIG. 8(c) illustrates a magnetic rail component plate, which is utilized to securely enclose the components that make up the flow tube assembly, in accordance with an exemplary embodiment of the present invention.
Figure 8D:
FIG. 8(d) illustrates a side view of the plate illustrated in FIG. 8(c).
Figure 8E:
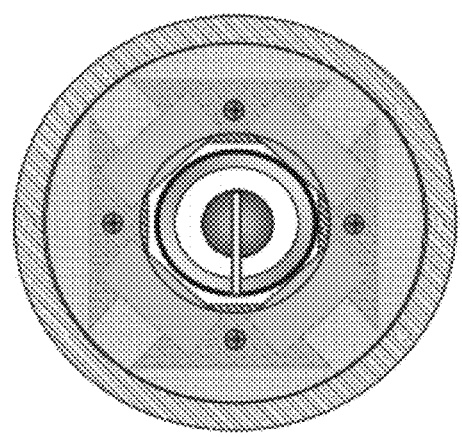
FIG. 8(e) illustrates a fully assembled phantom view, of an exemplary embodiment of the present invention, showing the sealed hollow core, core support member, and flow cavity, wherein fluids such as gasses or liquids may be conditioned and/or separated to a desired state.

FIGS. 8(a) through 8(c) depict several views of an exemplary embodiment of a magnetic fluid processor as describe in detailed above. Basically, FIG. 8(a) illustrates a cross-sectional end view of the exemplary embodiment, wherein a flow tube assembly comprising a plurality of magnets, a plurality of magnetic arrays to hold said magnets, a concentrically situated flow tube, and a hollow core enclosed within said magnetic arrays, are shown; FIG. 8(b) illustrates a cross-sectional view of the flow tube assembly's magnetic rails including staggered magnets, which carry the staggered magnets along the elongated housings that enclose the flow tube's core; FIG. 8(c) illustrates a magnetic rail component plate, which is utilized to securely enclose the components that make up the flow tube assembly; FIG. 8(d) illustrates a side view of the plate illustrated in FIG. 8(c); and FIG. 8(e) illustrates a fully assembled phantom view, of an exemplary embodiment of the present invention, showing the sealed hollow core, core support member, and flow cavity.

FIG. 9(a) through FIG. 9(c) show a schematic view of the flow tube assembly and an electrical return path system that includes a conductive member 80, (which may be any electrically conductive wire, such as copper, ferrous steel wire or any other electrical means adapted so that electricity can flow through), placed in communication between the flow tube assembly and an electrical potential less than the potential of the flow tube assembly.

One way to electrically connect conductive member 80 to flow tube 1 is to secure conductive member 80 at the outer surface of flow tube 1 using a conductive tape 70 (such as copper tape, aluminum tape, carbon tape, copper/nickel tape, aluminum/nickel tape, and the like). Conductive tape 70, in combination with soldering techniques known in the art, may also be used to secure the connection of conductive member 80 to flow tube 1. Conductive member 80 may be wrapped at least once around the outer surface of flow tube 1 prior to securing it with conductive tape 70, and may be secured at the fluid input or output end of flow tube 1.

A ground rod 90 is connected to the other end of conductive member 80 and to earth ground 111. The conductive tape methodology discussed above may also be used to secure conductive member 80 to ground rod 90. Also, conductive clamps or the like may be used to electrically connect conductive member 80 to ground rod 90.

In another embodiment of the present invention, a variable resistor (e.g. a standard known variable resistor) may be placed in electrical contact with the electrical return path system such that the variable resistor controls the amount of electrical return path floe through the electrical return path system. The variable resistor may be connected to conductive member 80 prior to earth ground 111.

FIG. 9(b) and FIG. 9(c) particularly depict the ground rod 90 used in the electrical return path system. As discussed earlier, the conventional solid copper or copper clad ground rods, typically serve as an electron sink for triboelectric and/or stray charges that move through moisture in the air and on or below the earth's surface. As a result, these outside charges create an impedance of electrical flow from the magnetic treatment device and may be high enough in charge wherein the grounded fluid being acted upon (or conditioned) actually becomes the lower potential in the circuit.

To overcome this problem, ground rod 90 may be implemented so that ground rod 90 is invisible to triboelectric and/or stray charges, which move through the moisture in the air and/or through the earth's surface.

In an exemplary embodiment, ground rod 90 includes a conductive base member 91 with an outer surface coating 91 of zinc or the like, and an outer surface cast 92 located at least near conical end 95 of ground rod 90. Conductive base ember 91 may be any conductive material such as steel or the like. The cross-sectional shape of conductive base member 91 may be cylindrical, square, rectangular, or oval, without limiting the scope of the present invention. Similarly, outer surface coating 91 may be formed by known methods such as galvanization, plating, or other coating methods without limiting the scope of the present invention. Outer surface cast 92 may be made of zinc or the like, and may encase some (i.e. one-sixth or one half of ground rod 90) or all of ground rod 90. Casting or coating methods known in the art may be used to add outer surface cast 92 around or to the outer portion of conductive base member 91.

The combinations of novel features discussed above, and as shown in FIGS. 1 through 9(c), enable higher volumes of electrons to be effectively removed from fluids. Results show that responses in fluid types that once took multiple passes through conventional magnetic fluid conditioner and separation devices, now only require one pass through the present invention to cause improved results.

Significantly, test results of fluids conditioned through processors in accordance with the present invention, and particularly in conjunction with ground rod 90, have shown an increase in electron flow volumes of no less than 10 to 50 times relative to measured flow volumes of prior devices utilizing conventional ground rods. Furthermore, such device in accordance with the present invention show increase stability in overall ground rod performance; thereby increasing fluid conditioning and separation efficiency, consistency, and predictability of results for said processors in accordance with the present invention.

Figure 10C:
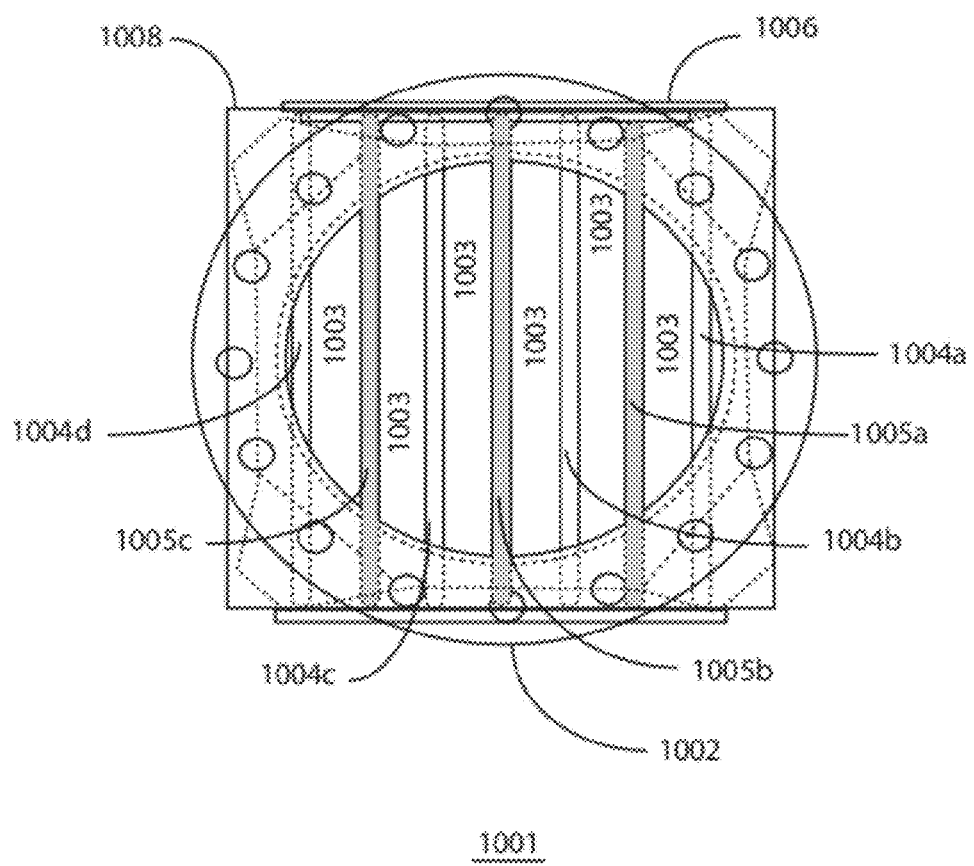
FIG. 10(c) illustrates a front view of the exemplary embodiment shown in FIG. 10(a) and FIG. 10(b), particularly exposing the various enclosures or walls that include alternating cores and magnetic housings configured to form a plurality of input and output ends for guiding a fluid through the processor.

Turning to the next figure, FIG. 10(a) illustrates a top phantom view of another exemplary embodiment of the present invention, wherein a processor comprises of a plurality of elongated enclosures for guiding a first fluid from a plurality of input ends in and through a plurality of output ends. In such embodiment, one or more enclosures include hollow cores configured to store a second fluid, and alternating enclosures are configured to generate a magnetic field so as to affect the electron configuration of the first fluid passing through the plurality of input ends and output ends.

More specifically, FIG. 10(a) shows fluid processor 1001 comprising of an elongated housing 1002, which includes support members 1006; said housing 1002 and support members 1006 securely containing within housing 1002 a plurality of enclosures 1004a, 1004b, 1004c, 1004d, 1005a, 1005b, and 1005c. Furthermore, at each end of housing 1002, an input end 1007 and an out put 1008 end are adapted to receive and dispense (respectively) a fluid being guided through housing 1002 of processor 1001.

The a plurality of enclosures 1004a, 1004b, 1004c, 1004d, 1005a, 1005b, and 1005c are configured in a manner so as to form a plurality of cavities or pathways 1003 between each enclosure, configured in a manner so as to provide housing 1002 with a plurality of input and output ends within processor 1001.

Furthermore, enclosures 1004a, 1004b, 1004c, 1004d, 1005a, 1005b, and 1005c are also configured in a manner so as to form or generate a magnetic field in order to affect an electron configuration. Alternative configurations for enclosures 1004a, 1004b, 1004c, 1004d, 1005a, 1005b, and 1005c are possible without deviating from the scope of the present invention.

However, in the exemplary embodiment shown, enclosures 1004a, 1004b, 1004c, and 1004d comprise of one or more magnetic arrays arranged in a manner so as to form or generate a magnetic field that affects the electron configuration of a fluid being guided or passing through pathways 1003. This process is aided by enclosures 1005a, 1005b, and 1005c, which comprise of cores that are adapted to store a fluid, said process being very similar and having the same effect as the process wherein a flow tube such as flow tube 400 is used.

As a fluid is guided or received by input end 1007 of processor 1001, the fluid is further guided or passes through pathways 1003 where the fluid's electron configuration is affected by the magnetic field(s) generated within housing 1002. Upon exiting or being dispensed from processor 10001 (i.e. dispensed out from output end 1008) the fluid has been processed to a desired state.

FIG. 10(*b*) illustrates a side view, particularly depicting general dimensions of the exemplary embodiment described with reference to FIG. 10(*a*). Naturally, several lengths, widths, heights, or sizes may be used without deviating from the scope of the present invention, but some dimensions may be desirable for particular applications.

In one embodiment, processor 1001 may be an inline processor comprising an 18" feed housing. In such embodiment the following dimensions may be desirable:
 a. a first length (as shown) $L_1$ may be 60";
 b. a second length (as shown) $L_2$ may be 12";
 c. a third length (as shown) $L_3$ may be 36";
 d. a first height (as shown) $H_1$ may be 25";
 e. a second height (as shown) $H_2$ may be 18"; and
 f. an internal width (not shown) for output 1008 may be 18".

In another embodiment, processor 1001 may be 42" pipeline (flanged) processor. In such embodiment the following dimensions may be desirable:
 a. a first length (as shown) $L_1$ may be 56";
 b. a second length (as shown) $L_2$ may be 10";
 c. a third length (as shown) $L_3$ may be 36";
 d. a first height (as shown) $H_1$ may be 53";
 e. a second height (as shown) $H_2$ may be 42"; and
 f. an external width (not shown) for housing 1002 may be 49".

FIG. 10(*c*) illustrates a front view of the exemplary embodiment shown in FIG. 10(*a*) and FIG. 10(*b*), particularly exposing the various walls or enclosures that include alternating cores or (enclosures 1005a, 1005b, and 1005c adapted to store a fluid) and magnetic housings (or enclosures 1004a, 1004b, 1004c, and 1004d) said walls or enclosures configured to form a plurality of input and output ends or pathways 1003 for guiding a fluid through housing 1002 of processor 1001.

For example, and without limiting the scope of the present invention, processor 1001 may be used in a water treatment facility to purify or treat a water system. In said embodiment, processor 1001 may be used to process and produce a more purified stream of water. A less purified or contaminated stream of water may be guided through processor 1001 and utilizing the magnetic field generated within housing 1002, said stream of water would undergo a process wherein the water's electrons would me altered or affected in a manner so that the bonds are broken between the water and contaminates that flow out of output end 1008.

Figure 11:
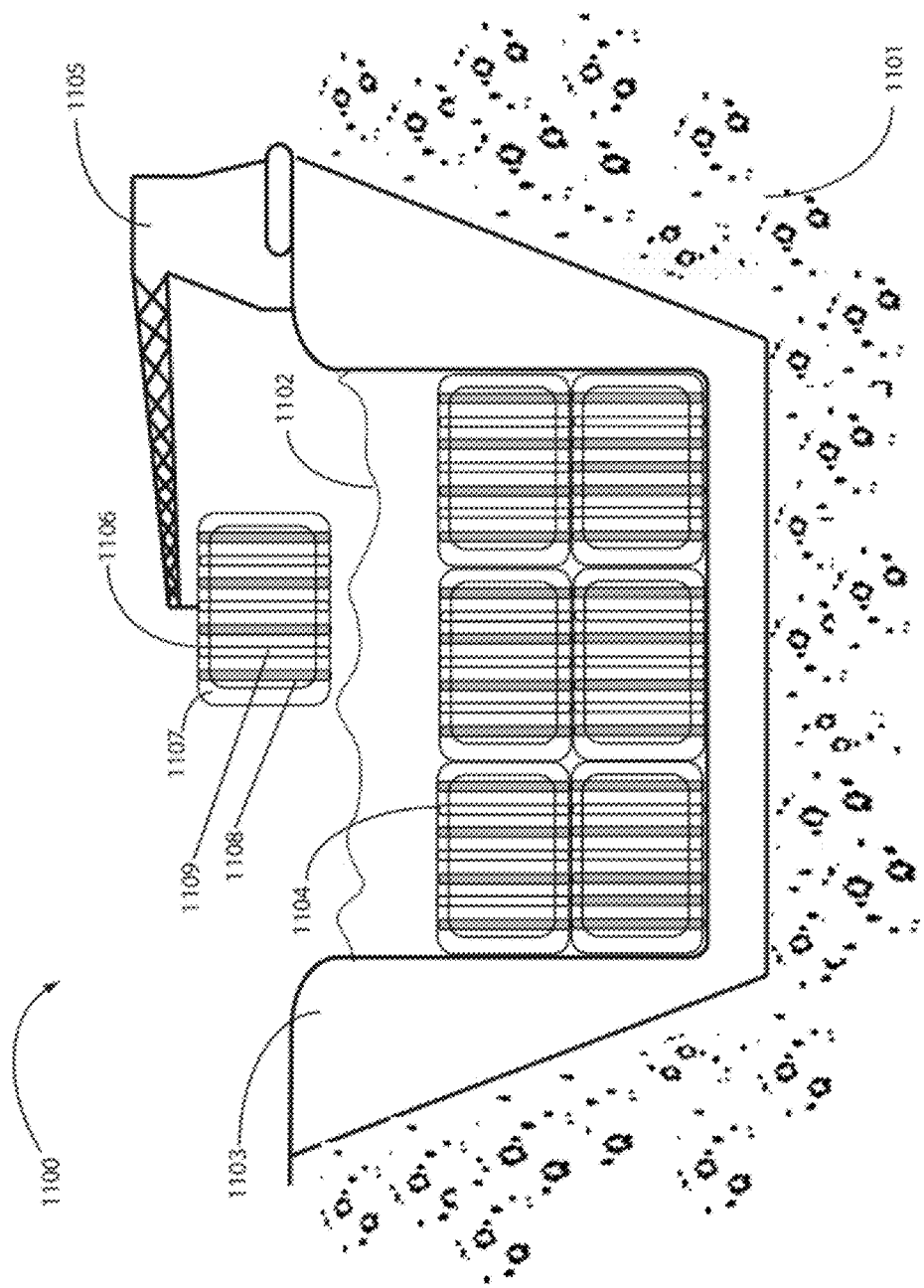
FIG. 11 illustrates yet another exemplary embodiment of the present invention, wherein substantially cubically shaped processors are used in waterway (e.g. river bed) that has been adapted to receive said processors for a water treatment system in accordance with the present invention.

Turning to the next figure, FIG. 11 illustrates yet another exemplary embodiment of the present invention, wherein substantially cubically shaped processors are used in for example a waterway (e.g. river bed) that has been adapted to receive said processors for a water treatment system in accordance with the present invention.

More specifically, FIG. 11 shows a cross-sectional frontal view of water treatment system 1100, comprising river bed 1101 wherein a river 1102 flows through, foundation 1103, which has been adapted to receive a plurality of magnetic field processor modules 1104, and crane 1105 for lowering or removing said plurality of processor modules 1104 depending on a desired configuration or for example, to conform to river 1102's water level as it passes through foundation 1103.

Foundation 1103 may be any type of currently used foundations such as those found in washes or water draining systems throughout cities. Foundation 1103 must however be adapted to receive processor modules 1104 in a manner so that water flow is consistent with the goals of system 1100. Typically, foundation 1103 is constructed of known materials and is placed on river bed 1101, which most likely is a waterway that leads to or is being used for water treatment purposes. However, it will be evident from the examples following bellow, that system 1100 may be utilized for many other applications.

Crane 1105 may be any type of known device that is adapted to raise and lower processor modules 1104 in and out of foundation 1103. This is desirable since the water levels of river 1102 may be dynamic, either because of natural reasons or because of a desired water flow control.

For example, in an exemplary embodiment of system 1100, crane 1105 is a lifting machine equipped with a winder, wire ropes or chains and sheaves that are used both to lift and lower processor modules 1104 and is also able to move them horizontally. In such embodiment, crane 1105 uses one or more simple machines to create mechanical advantage and thus move the loads of said modules. Crane 1105 may be one such as those cranes commonly employed in the transport industry for the loading and unloading of freight, or in the construction industry for the movement of materials, or in the manufacturing industry for the assembling of heavy equipment, without limiting the scope of the present invention.

In the illustrated exemplary embodiment, crane 1105 is shown lifting processor module 1106 removing it from the basin or foundation 1103. Processor module 1106 is very much like the processor disclosed with reference to FIG. 10(*a*) through 10(*c*). However, instead of having a tubular housing, module 1106 is substantially cubical and comprises a substantially cubical housing 1107. Inside housing 1107, module 1106 further includes a plurality of walls or enclosures that are configured in a manner similar to processor 1001.

For example, enclosures 1108 store a fluid and thereby create a plurality of cores and enclosures 1109 house magnetic components. Both enclosures 1108 and 1109 are configured to generate a magnetic field and process water as it passes or is guided through housing 1107 of module 1106.

Variations of a processor's components (i.e. housing configurations or enclosures configurations) will not deviate or limit the scope of the present invention. Again, the above embodiments of the present invention have many applications as will be shown by the following examples, which are meant to further explain the dynamic uses and practices in accordance with the present invention, but are in no way described to limit or deviate from the scope of the present invention.

EXAMPLE 1

Killing or Growing Microorganisms in Fluids

The magnetic conditioner and separation device disclosed herein may be used to kill or grow microorganisms (such as bacteria, viruses, yeast, mold, or algae) in fluids. The present invention shows fluid treatment effects not typically achieved in a single pass utilizing conventional magnetic fluid treatment systems. For example, and without deviating from the scope of the present invention, results have proved the processor's capacity to kill high volumes of microorganisms down to the non-detect levels in a highly microorganism-rich fluid. As discussed above, this may be achieved with an electrical return path system connected at the fluid input end of a flow tube, and magnet sections configured in a positive or north position.

There are many applications where reduction of microbial activity is desirable. These applications can range from clearing ponds that have too much algae, to purifying water for human consumption.

All fluid and gas borne microorganisms are killed when they flow through the inline processor. Professional biochemist testing has shown that the process of stripping electrons from all sources within and from the flowing fluid and or gases such as air, have proposed two possible causes for this effect.

Either the electron stripping process destroys microorganism DNA and kills said organisms or disrupts the necessary electron transport mechanism that regulates the pH balance within said microorganisms so that microorganisms cannot effectively survive; in all cases, microorganisms that pass through the processor are effectively killed.

Applications where such practices are beneficial include, without limitation:
 a. Water related applications such as wastewater treatment, dual pipe gray water systems, irrigation systems, drinking water supplies and treatment processes, ponds, swimming pools, and makeup water for boilers and food products.
 b. Oil related applications are industry wide and range from the well site to final distribution sites. For example, some microorganisms that are very problematic in said industry include sulfide-reducing bacteria that are responsible for reduction of oil, biofilm production and fouling, corrosion and the production of foul odors that produce a smell often causing nuisance issues in the industrial site as well as in the surrounding environment.

Alternatively, if the desired effect is to substantially increase the growth of microorganisms within a fluid, such fluid may flow through a device or processor in accordance with the present invention wherein an electrical return path system connected at the fluid output end of a flow tube is configured with the magnet sections in a negative or south position.

There are many applications where it is desirable to enhance the biological activity of microorganisms. Sanitation districts around the world use microbes to reduce the high volumes of organic material that flow into their facilities for treatment and discharge. The vitamin industry uses microbes to manufacture enzymatic products.

Another example is found in the potato industry. Microbes are used in the potato industry to reduce the high volumes of starch that encapsulate the potato skin and reduce the ability to sufficiently dry them for storage and reuse as a cattle feed amendment.

The inline processor can be configured to add electrons into what flows through it and tests have shown the process can very significantly enhance the growth rate of such microorganisms. Microorganisms used in these processes are living organisms that are very dependent on their environment for life. Thus, the ability to enhance their growth rate can substantially reduce the severity of an upset or imbalance in a system that is dependent on microbes.

EXAMPLE 2

Percolation Enhancement

Water percolation is a process that is often used by water districts to replenish their underground water supplies. Most often water from a river flow is routed to collection ponds directly over their underground aquifer which they draw water from and with further treatment they then provide this water to their customers as drinking water.

These ponds also serve as a primary filtration system analogous to giant sand filters that pre-filters the water prior to entering the underground porous layer called the aquifer. The percolation process using these ponds is effective and has been used for many years. The percolation rate drops off as the pond bottom becomes loaded with settling particulate and algae.

These materials form a layer typically called scale, which dramatically decreases the flow rate through the pond bottom and into the aquifer below. It is common practice for the water district to stop the flow of water into the pond(s) and allow the pond(s) to drain after which they will at great expense and with the use of heavy equipment remove about four inches of sediment or scale from the pond's basin. Once this process is complete they resume the process by allowing water to again flow back into the pond to eventually repeat this cycle over and over again.

Testing has shown that with the use of an inline processor in accordance with the present invention, a hard scale does not form because the bulk of the waterborne microorganisms that are responsible for this hardening of the scale are killed off when they flow through the processor. Testing has also shown that the average percolation rate is increased by 56 percent. The time interval between each required cleaning process is dramatically increased as well.

EXAMPLE 3

De-Watering Processes

Mechanical de-watering processes are often used to reduce the overall weight and volume of materials that are wet. These materials can have high amounts of surface moisture combined with "bound water" which is described as intra-cellular or extra-cellular moisture or a combination of both.

Municipal sludge is a material that is de-watered prior to hauling to disposal sites or other process sites. Coal and sawdust are de-watered to raise their Btu values.

Existing mechanical processes such as filter belt presses, centrifuges or screw presses use pressure or centrifugal force to break the bonds between the water and the material it is bound to. As a pre-treatment the inline processor serves these mechanical processes by stripping away electrons from the water and contaminates contained therein. The molecular bonds between these materials and water become broken and all materials disassociate with much more ease. This raises the efficiency and effectiveness of the typical mechanical separation process.

EXAMPLE 4

Applications to Fuel Systems

An in-line processor in accordance with the present invention serves this application by increasing the Btu or caloric output of fuels while reducing the combustion emissions or byproducts. All fuels liquid, gases or solids are typically in a neutral charge state, which basically means they have equilibrium between total negative and positive charges. A processor, in accordance with one embodiment of the present invention, removes electrons from these fuels and causes the fuel to become positively charged prior to the addition of air.

Fuel requires air for combustion to take place. The air serves to re-supply the required electrons to the fuel since air is electronegative and gives up electrons readily. This electron sharing process causes the air to more uniformly bond to the fuel with the resulting benefit of a more complete and efficient fuel system.

EXAMPLE 5

Dust Control

Dust that is kicked up into the air by moving equipment whether at mine sites or construction sites or just on dirt roads is a nuisance often referred to as fugitive dust and is often responsible for accidents on the jobsite and negative effects on the environment. The use of large tanker trucks to lay down a spray of water reduces the problem but is not as effective when the soil has a great deal of clay in it. The water will simply not penetrate the surface and once the water has evaporated, the dust will again flow up into the air and cause fugitive dust to emit into the environment. Testing has shown that if an inline processor in accordance with the present invention is used to treat the water that is used to fill these water trucks the water when sprayed onto all soil types including clay soils penetrates the soil and mitigates this problem with less effort and less water, thereby creating a more desirable system wherein water is conserved, less fugitive dust is emitted, thus enabling the environment to be safer and better preserved.

EXAMPLE 6

Separation of Materials in Solutions

Emulsions are often considered problematic and require chemicals to change ph levels, flocculent to float very fine materials; coagulants to settle out the same. Heat is often used as well. Emulsions are common in several industries and are typically broken and separated using costly and often dangerous materials. Use of these treatment processes in combination with mechanical equipment such as oil water separators, dissolved air floatation systems, hydroclones, centrifuges, settling ponds and tanks is common throughout industry.

Utilizing a processor in accordance with the present invention produces a bond breaking affect when used as a pretreatment device, effectively reducing the need for most of the chemicals otherwise used, thereby greatly enhancing the performance and efficiency of the mechanical process equipment as well as providing improved results. When the earth's gravity is the primary separating force used to separate materials of differing specific gravities such as is the case with settling ponds and tanks, tests have shown that such materials settle out more rapidly and the resulting fluid has greater clarity.

EXAMPLE 7

Fluid Filtration Systems

The present invention may also be used in combination with a fluid filtration system using at least one membrane filter in order to increase the filtration effectiveness of the filtration system, as well as prolong the usable life of membrane filters located downstream from processors.

Filtration systems of all shapes and sizes make use of pressure and a media or membrane to segregate out materials from a fluid such as water. The materials in the fluid are typically bound to the fluid at the molecular level. Pressure is used to break these bonds and to force the fluid to flow through the filter and beyond. The filter serves to break bonds and segregate material. As the material builds up on the filter the flow rate of the filter goes down. If the pressure is not increased at some point, the filter will typically require cleaning or replacement.

In situations where there is an automatic backwash system the system would go through a cleaning process intended to restore the filter to a higher flow rate. For example, reverse osmosis systems have two streams of water in them. The cleaned water that goes through the membrane is called permeate or product stream. The concentrate stream is an ongoing flow of water that moves across each membrane which is serving a cleaning function that carries away the particulate left behind on the membrane surface.

Tests have shown an increase performance and efficiency of any filtration system retrofitted with inline processors in accordance with the present invention, which are typically implemented to pre-treat the fluid being filtered. The bonds between both the fluid and contaminates are broken down thereby reducing stress on the filtering process by reducing the amount of unwanted materials being passed through each filtering device.

Stripping the electrons from the fluid causes the fluid to temporarily loss its ability to bond to itself and to anything else including the filter media or membrane. Filters that remove particulate down to the micron sizes have extended filter life do to the elimination of biofouling and reduction of back pressure on the filter surface caused by the typical bond breaking process.

Examples of this benefit were seen in many tests. Two of these tests involved filter systems that were monitored daily by water district personnel. Each of these systems had extensive performance records prior to our testing them using an inline processor as pretreatment. One system was a microfiltration system that had a typical run profile of 3 to 4 days of running until the trans-membrane pressure reached a set point at which the system would be taken off line for chemical cleaning and then be returned to service.

After installing an inline processor, in accordance with the present invention, this same system ran thirty days and only reached half the set point pressure required for a cleaning cycle to begin. The second system was an RO (reverse osmosis) system that was used to cleanup brackish water with a TDS (total dissolved solids) content of 6,550. The normal RO product water quality that this system produced was 500 TDS. The processor was installed on the water feed line for this system and we then waited ten minutes to be sure that all of the water produced by this system was in fact water that had passed through the inline processor. The product water for this system was tested and now measured only 57 TDS. This made the system more efficient and naturally, more cost effective.

EXAMPLE 8

Agricultural Applications Where Irrigation is the Primary Source of Water

It is well known that plants require water as a necessary ingredient to grow healthy and strong. Plants draw water up through their roots and on up to their leaves where it evaporates to the atmosphere. This is called the evapotranspiration process. The easier this process is for a plant the less stress there is on it. The plant grows healthier and faster as a result. All fruit bearing plants exhibit greater production when water flows more easily through them. Healthy plants are also more resistant to bugs and bugs apparently are less interested in healthy plants as well. Bugs are seen in greater numbers and more frequently on stressed, dying or rotting plants.

Processed water or water that has flowed through the inline processor flows more easily through the soil and up into the plant's leaves. Micronutrients in the soil can present themselves as a restriction to this flow under normal circumstances however processed water flows more easily around them breaking them down into smaller micronutrients, which are transported through the root membrane with the water and on up into the plant.

On one particular test in a farming site, the site had been growing Kiwis for over 35 years wherein it was regular practice to typically prune the trees in such a way so as to remove some buds so that others would grow to a marketable size. The practice was deemed necessary by that farm, and in fact experience showed that if the practice was not implemented potentially all of the farm fruits would be too small thereby unmarketable. After installing an inline processor, in accordance with the present invention, on the farm's irrigation line tests demonstrated that water was getting up into the trees more efficiently.

Briefly, the test involved a non-contact infrared thermometer used to measure the temperature of the top of a leaf and then measure the temperature below that leaf since their should be a greater difference in these two reading if there was more water in the leaf—water presented itself as a thermal barrier. The test involved use of a first set of trees as a control, and a second set of trees as the test site; both sets or blocks of trees where in the same vicinity, with the same soil composition, and sunlight.

These two readings where gathered on many leaves and the data was recorded. Test results showed on average a 10 degree difference between the two readings taken from each leaf on the test site site. The same test was performed on the control site where the block of trees was not treated with processed water using a magnetic fluid processor in accordance with the present invention.

On the control block of trees the average temperature difference between the reading above the leaf and below the leaf was only 2 degrees. After gathering data and results, the farm proceeded to refrain from pruning the trees that were being irrigated using the inline processor on the main irrigation line. Tests showed that all of the fruit from that 100 acre block had sized up and was higher in sugar content or brix than any other fruit on the farm at that time in the season. These results meant that the farm not only yielded two thirds more crop from that 100 acres was therefore able to dispatch the fruit to the market earlier when the demand was still high for this type of fruit.

A system and method for conditioning fluids utilizing a magnetic fluid processor has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A fluid conditioning system, comprising:
 a source for providing a first fluid; and
 a sink for emitting said first fluid, wherein said first fluid is emitted into said sink in a conditioned state after being processed by a fluid processor, said fluid processor further comprising:
  a first elongated housing coupled to said source and said sink, said first elongated housing adapted to guide said first fluid from an input end in and through an output end of said first elongated housing,
  a second elongated housing containing a second fluid; wherein said second elongated housing is situated within said first elongated housing, and
  a third elongated housing comprising:
  a plurality of staggered magnets in a longitudinal direction in relation to said first and second elongated housings; and
  a plurality of non-electrically conductive spacers situated between respective staggered magnets;
  wherein said plurality of staggered magnets are configured to generate a magnetic field in a manner so as to affect an electron configuration of said first fluid; and
  further wherein the second fluid comprises an inert gas or a non-electrically conductive fluid.

2. The fluid conditioning system of claim 1, further comprising an electrical conductive member placed in electrical contact with said second elongated housing and to an electrical potential less than the potential of said second elongated housing so that electrical charges are removed from said second elongated housing.

3. The fluid conditioning system of claim 2, wherein said inert gas comprises Argon.

4. The fluid conditioning system of claim 2, wherein said electrical potential is ground.

5. The fluid conditioning system of claim 1, wherein said third elongated housing is situated within said first elongated housing and encloses said second elongated housing.

6. The fluid conditioning system of claim 1, wherein said third elongated housing encloses said first elongated housing.

7. The fluid conditioning system of claim 1, wherein said plurality of staggered magnets are configured in alternating polarities.

8. The fluid conditioning system of claim 1, wherein said plurality of staggered magnets are configured in non-alternating polarities.

9. The fluid conditioning system of claim 8, wherein said non-alternating polarities include magnets staggered in an all north or positive configuration so as to promote an antimicrobial environment.

10. The fluid conditioning system of claim 8, wherein said non-alternating polarities include magnets staggered in an all south or negative configuration so as to promote a pro-microbial environment.

11. The fluid conditioning system of claim 2, wherein the electrical conductive member further comprises a ground rod.

12. The fluid conditioning system of claim 11, wherein the ground rod is substantially enclosed by an outer surface coating.

13. The fluid conditioning system of claim 12, wherein the ground rod further comprises an outer surface cast with a conical-shaped end portion.

14. The fluid conditioning system of claim 13, wherein the outer surface cast and conical-shaped end portion are comprised of zinc.

15. A fluid conditioning system, comprising:
a first source for providing a first fluid;
a second source for providing a second fluid;
a sink for emitting said first and second fluids, wherein said first and second fluids are mixed and emitted into said sink in a conditioned state after being processed by a fluid processor, said fluid processor further comprising:
a first elongated housing coupled to said source and said sink, said first elongated housing adapted to guide said first and second fluids from an input end in and through an output end of said first elongated housing;
a second elongated housing containing a third fluid;
wherein said second elongated housing is situated within said first elongated housing; and
a third elongated housing comprising:
a plurality of staggered magnets in a longitudinal direction in relation to said first and second elongated housings; and
a plurality of non-electrically conductive spacers situated between respective staggered magnets;
wherein said plurality of staggered magnets are configured to generate a magnetic field in a manner so as to affect an electron configuration of said first and second fluids; and
further wherein the third fluid comprises an inert gas or a non-electrically conductive fluid.

16. The fluid conditioning system of claim 15, further comprising an electrical conductive member placed in electrical contact with said second elongated housing and to an electrical potential less than the potential of said second elongated housing so that electrical charges are removed from said second elongated housing.

17. The fluid conditioning system of claim 15, wherein said third elongated housing is situated within said first elongated housing and encloses said second elongated housing.

18. The fluid conditioning system of claim 15, wherein said third elongated housing encloses said first elongated housing.

19. The fluid conditioning system of claim 15, wherein said plurality of staggered magnets are configured in alternating polarities.

20. The fluid conditioning system of claim 15, wherein said plurality of staggered magnets are configured in non-alternating polarities.

21. The fluid conditioning system of claim 20, wherein said non-alternating polarities include magnets staggered in an all north or positive configuration so as to promote an anti-microbial environment.

22. The fluid conditioning system of claim 20, wherein said non-alternating polarities include magnets staggered in an all south or negative configuration so as to promote a pro-microbial environment.

23. A fluid conditioning system, comprising:
a source for providing a first fluid;
a sink for emitting said first fluid, wherein said first fluid is emitted into said sink in a conditioned state after being processed by a fluid processor, said fluid processor further comprising:
a first elongated housing coupled to said source and said sink, said first elongated housing adapted to guide said first fluid from an input end in and through an output end of said first elongated housing;
a second elongated housing containing an inert gas;
wherein said second elongated housing is situated within said first elongated housing;
a third elongated housing comprising:
a plurality of staggered magnets in a longitudinal direction in relation to said first and second elongated housings;
a plurality of non-electrically conductive spacers situated between respective staggered magnets;
wherein said plurality of staggered magnets are configured to generate a magnetic field in a manner so as to affect an electron configuration of said first fluid; and
an electrical conductive member placed in electrical contact with said second elongated housing and to an electrical potential less than the potential of said second elongated housing so that electrical charges are removed from said second elongated housing, wherein said electrical potential is ground.

* * * * *